United States Patent
Long et al.

(10) Patent No.: US 7,240,329 B1
(45) Date of Patent: Jul. 3, 2007

(54) POLICIES ON A PER INSTANCE BASIS

(75) Inventors: David J. Long, Walnut Creek, CA (US); David B. Pitfield, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 561 days.

(21) Appl. No.: 10/040,499

(22) Filed: Dec. 28, 2001

Related U.S. Application Data

(63) Continuation of application No. 09/853,823, filed on May 11, 2001, now Pat. No. 7,185,005.

(60) Provisional application No. 60/204,196, filed on May 12, 2000.

(51) Int. Cl.
*G06F 9/44* (2006.01)
*G06F 17/30* (2006.01)

(52) U.S. Cl. .................. 717/116; 717/165; 719/332; 707/200

(58) Field of Classification Search ............... 717/116; 707/102, 103, 200
See application file for complete search history.

(56) References Cited

U.S. PATENT DOCUMENTS

| | | | |
|---|---|---|---|
| 5,047,918 A | 9/1991 | Schwartz | |
| 5,202,982 A | 4/1993 | Gramlich et al. | |
| 5,222,242 A | 6/1993 | Choi et al. | 395/800 |
| 5,257,366 A | 10/1993 | Adair et al. | |
| 5,295,256 A | 3/1994 | Bapat | 707/3 |
| 5,307,490 A | 4/1994 | Davidson et al. | 709/203 |
| 5,313,629 A | 5/1994 | Abraham et al. | 395/600 |
| 5,327,556 A | 7/1994 | Mohan et al. | 395/600 |
| 5,388,257 A | 2/1995 | Bauer | 395/600 |
| 5,457,793 A | 10/1995 | Elko et al. | 395/600 |

(Continued)

FOREIGN PATENT DOCUMENTS

EP  0856803 A2  8/1998

(Continued)

OTHER PUBLICATIONS

"The Java™ Virtual Machine Specification", retrieved Feb. 7, 2005 from the Internet. URL: http://java.sun.com/docs/booksvmspec/html/ClassFile.doc.html.

(Continued)

*Primary Examiner*—Tuan Dam
*Assistant Examiner*—Michael J. Yigdall
(74) *Attorney, Agent, or Firm*—Hickman Palermo Truong & Becker LLP

(57) ABSTRACT

A method and apparatus for associating methods or attributes on a per-instance basis is provided. One technique for providing "per-instance attributes" involves properties and property bundles. A second technique for providing "per-instance attributes" involves categories wherein the instance can be thought of as being "placed" into one or more categories. A technique for providing "per-instance methods" involves policies. In any of these techniques, providing per-instance properties may be used in any of the following ways: (1) different instances of the same class are associated with different properties where the properties are not in the class; and (2) two instances of two different classes are associated with the same property where the property is not in either of the two classes.

24 Claims, 19 Drawing Sheets

U.S. PATENT DOCUMENTS

| | | | |
|---|---|---|---|
| 5,499,371 A | 3/1996 | Henninger et al. | 707/102 |
| 5,504,892 A | 4/1996 | Atsatt et al. | 707/103 R |
| 5,544,360 A | 8/1996 | Lewak et al. | |
| 5,561,763 A | 10/1996 | Eto et al. | |
| 5,566,331 A | 10/1996 | Irwin, Jr. et al. | |
| 5,574,915 A | 11/1996 | Lemon et al. | 712/220 |
| 5,682,524 A | 10/1997 | Freund et al. | 711/5 |
| 5,689,706 A | 11/1997 | Rao et al. | |
| 5,701,485 A * | 12/1997 | Guillen et al. | 719/315 |
| 5,737,736 A | 4/1998 | Chang | |
| 5,778,179 A | 7/1998 | Kanai et al. | |
| 5,799,305 A | 8/1998 | Bortvedt et al. | 707/10 |
| 5,822,511 A | 10/1998 | Kashyap et al. | |
| 5,825,353 A | 10/1998 | Will | |
| 5,832,526 A | 11/1998 | Schuyler | |
| 5,848,246 A | 12/1998 | Gish | |
| 5,864,870 A * | 1/1999 | Guck | 707/104.1 |
| 5,870,757 A | 2/1999 | Fuller | 707/201 |
| 5,873,093 A * | 2/1999 | Williamson et al. | 707/103 R |
| 5,878,411 A * | 3/1999 | Burroughs et al. | 707/4 |
| 5,878,434 A | 3/1999 | Draper et al. | |
| 5,892,535 A | 4/1999 | Allen et al. | |
| 5,913,063 A | 6/1999 | McGurrin et al. | |
| 5,915,253 A | 6/1999 | Christiansen | 706/47 |
| 5,918,225 A | 6/1999 | White et al. | 707/1 |
| 5,937,406 A | 8/1999 | Balabine et al. | 707/100 |
| 5,956,506 A | 9/1999 | Cobb et al. | |
| 5,956,730 A | 9/1999 | Burroughs et al. | 707/104.1 |
| 5,978,791 A | 11/1999 | Farber et al. | |
| 5,991,771 A | 11/1999 | Falls et al. | |
| 6,014,733 A | 1/2000 | Bennett | |
| 6,021,414 A | 2/2000 | Fuller et al. | |
| 6,023,706 A | 2/2000 | Schmuck et al. | |
| 6,029,160 A | 2/2000 | Cabrera et al. | |
| 6,029,166 A | 2/2000 | Mutalik et al. | |
| 6,029,175 A | 2/2000 | Chow et al. | |
| 6,044,224 A * | 3/2000 | Radia et al. | 717/162 |
| 6,052,122 A | 4/2000 | Sutcliffe et al. | |
| 6,078,925 A | 6/2000 | Anderson et al. | 707/103 R |
| 6,078,926 A | 6/2000 | Jensen et al. | |
| 6,085,198 A | 7/2000 | Skinner et al. | 707/103 R |
| 6,088,694 A | 7/2000 | Burns et al. | |
| 6,092,086 A | 7/2000 | Martin et al. | |
| 6,094,649 A | 7/2000 | Bowen et al. | |
| 6,115,741 A | 9/2000 | Domenikos et al. | |
| 6,119,118 A | 9/2000 | Kain, III et al. | |
| 6,119,151 A * | 9/2000 | Cantrell et al. | 709/216 |
| 6,128,771 A | 10/2000 | Tock et al. | |
| 6,173,292 B1 | 1/2001 | Barber et al. | 707/200 |
| 6,185,574 B1 | 2/2001 | Howard et al. | |
| 6,209,000 B1 | 3/2001 | Klein et al. | 707/203 |
| 6,212,512 B1 | 4/2001 | Barney et al. | |
| 6,216,212 B1 | 4/2001 | Challenger et al. | 711/163 |
| 6,233,729 B1 | 5/2001 | Campara et al. | |
| 6,247,024 B1 | 6/2001 | Kincaid | |
| 6,298,478 B1 | 10/2001 | Nally et al. | |
| 6,301,605 B1 | 10/2001 | Napolitano et al. | |
| 6,314,408 B1 | 11/2001 | Salas et al. | |
| 6,321,219 B1 | 11/2001 | Gainer et al. | |
| 6,324,581 B1 | 11/2001 | Xu et al. | 709/229 |
| 6,336,216 B1 * | 1/2002 | Curtis et al. | 717/174 |
| 6,339,382 B1 | 1/2002 | Arbinger et al. | |
| 6,345,288 B1 | 2/2002 | Reed et al. | 709/201 |
| 6,345,382 B1 * | 2/2002 | Hughes | 717/100 |
| 6,349,295 B1 | 2/2002 | Tedesco et al. | |
| 6,366,921 B1 | 4/2002 | Hansen et al. | |
| 6,366,988 B1 | 4/2002 | Skiba et al. | |
| 6,370,548 B1 | 4/2002 | Bauer et al. | |
| 6,385,618 B1 * | 5/2002 | Ng et al. | 707/103 Y |
| 6,389,433 B1 | 5/2002 | Bolosky et al. | |
| 6,397,231 B1 | 5/2002 | Salisbury et al. | |
| 6,418,451 B1 | 7/2002 | Maimone | |
| 6,421,692 B1 | 7/2002 | Milne et al. | 345/716 |
| 6,438,550 B1 | 8/2002 | Doyle et al. | |
| 6,442,548 B1 | 8/2002 | Balabine et al. | 707/10 |
| 6,446,075 B1 | 9/2002 | Velasco | 707/102 |
| 6,446,091 B1 | 9/2002 | Noren et al. | |
| 6,457,017 B2 * | 9/2002 | Watkins et al. | 707/103 R |
| 6,457,065 B1 | 9/2002 | Rich et al. | |
| 6,513,056 B1 | 1/2003 | Copeland et al. | 709/101 |
| 6,523,171 B1 * | 2/2003 | Dupuy et al. | 717/136 |
| 6,549,916 B1 | 4/2003 | Sedlar | 707/200 |
| 6,567,819 B1 | 5/2003 | Cheng et al. | 707/101 |
| 6,594,823 B1 | 7/2003 | Corbin et al. | 717/143 |
| 6,601,071 B1 | 7/2003 | Bowker et al. | |
| 6,625,602 B1 | 9/2003 | Meredith et al. | |
| 6,684,222 B1 | 1/2004 | Cornelius et al. | |
| 6,697,846 B1 | 2/2004 | Soltis | 709/217 |
| 6,721,727 B2 | 4/2004 | Chau et al. | |
| 6,766,330 B1 | 7/2004 | Chen et al. | |
| 6,769,124 B1 * | 7/2004 | Schoening et al. | 719/316 |
| 6,810,429 B1 | 10/2004 | Walsh et al. | 709/246 |
| 6,901,588 B1 | 5/2005 | Krapf et al. | 717/164 |
| 6,922,708 B1 | 7/2005 | Sedlar et al. | |
| 6,970,975 B2 | 11/2005 | Frank | |
| 2001/0047385 A1 | 11/2001 | Tuatini | 709/203 |
| 2002/0035645 A1 | 3/2002 | Tuatini | 709/310 |
| 2002/0073091 A1 | 6/2002 | Jain et al. | 707/100 |
| 2002/0091702 A1 | 7/2002 | Mullins | 707/100 |
| 2002/0107835 A1 | 8/2002 | Coram et al. | |
| 2003/0195865 A1 | 10/2003 | Long et al. | |
| 2003/0195866 A1 | 10/2003 | Long et al. | |
| 2003/0200197 A1 | 10/2003 | Long et al. | |

FOREIGN PATENT DOCUMENTS

WO      WO 97/46956      12/1997

OTHER PUBLICATIONS

Balter, A., "Alison Balter's Mastering Access 97 Development" *Sams Publishing* (1997) Chapter 22, pp. 1-4.

"Mapping A Relational Database to a Hierarchical File System" *IBM* (1995) 3 pages.

Herman Chung-Hwa Rao, et al., "An Overview of the Internet File System," 1997, IEEE, XP-002204711, pp. 474-477.

Oracle, "Oracle iFS (Internet File System)," Mar. 1999, XP-002204710, 3 pages.

Dourish, Paul et al., "Extending Document Management Systems with User-Specific Active Properties," ACM transactions on Information Systems, vol. 18, No. 2, Apr. 2000, pp. 140-170.

Lowis, Martin von, "Virtual Method Tables in Python" [online][retrieved at] http://foretec.com/python/workshops/1998-11/proceedings/papers/lowis/lowis.html>(1998) 11 pages.

Oracle® Internet File System™ Developer's Guide Release 1.1, Part No. A75172-04 (2000) 90 pages.

* cited by examiner

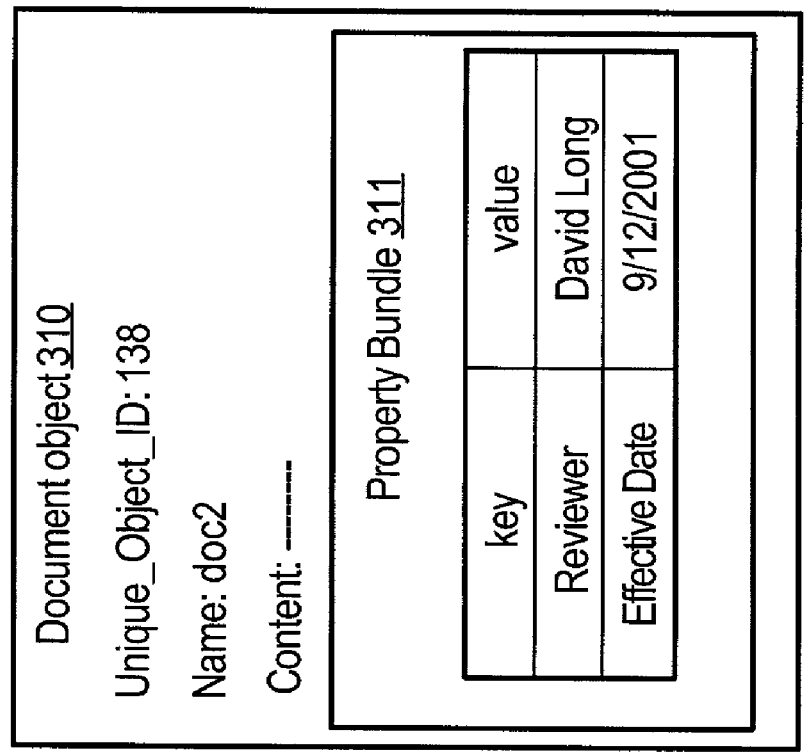
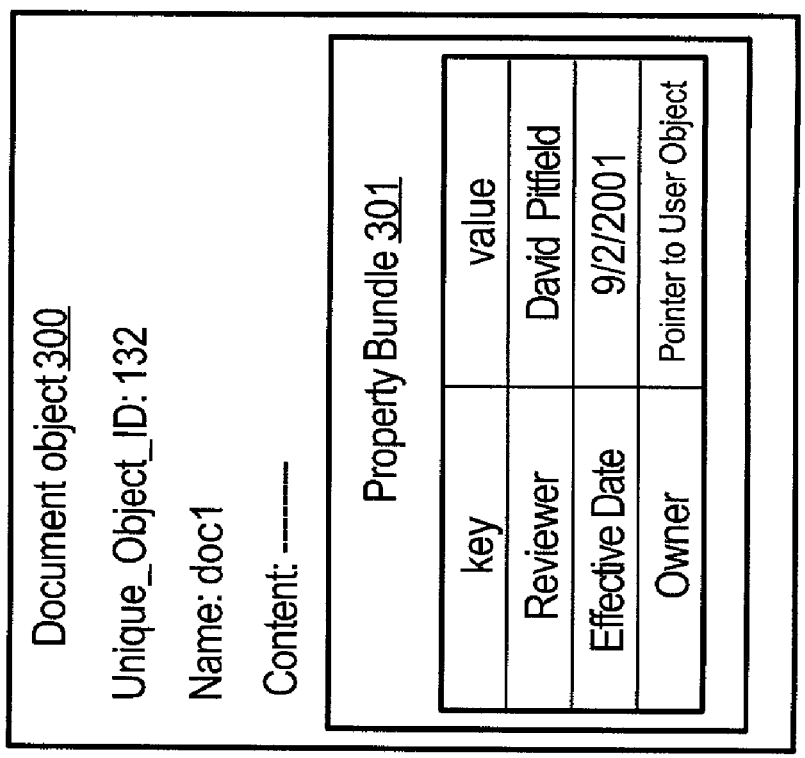
FIG. 3a

Document object 440

Unique_Object_ID: 139

Name: doc3

Content: ———

Property Bundle Pointer: NULL

FIG. 4b

| Policy Name | Method | Method Implementation |
|---|---|---|
| Publish by Copy and Lock | Publish | publish_by_copy_and_lock — 901 |
| Publish by Open for Review | Publish | publish_by_open_for_review — 902 |
| Publish by Email to News Group | Publish | publish_by_email_to_news_group — 903 |
| Publish by Broadcast | Publish | publish_by_broadcast — 904 |

| Policy Name | Method | Method Implementation |
|---|---|---|
| Delete from Disk and Archive | Delete | delete_from_disk_and_archive — 905 |
| Delete from Disk and Notify | Delete | delete_from_disk_and_notify — 906 |
| Delete and Request Permission | Delete | delete_and_request_permission — 907 |
| Delete from Tape | Delete | delete_from_tape — 908 |

FIG. 9

POLICIES ON A PER INSTANCE BASIS

PRIORITY CLAIM AND CROSS-REFERENCE TO RELATED APPLICATIONS

This application is a continuation-in-part of and claims domestic priority from prior U.S. patent application Ser. No. 09/853,823, filed on May 11, 2001 now U.S. Pat. No. 7,185,005 entitled "Nested Transactions in a File System", by David Long and David Pitfield, which claims domestic priority from prior U.S. Provisional Application Ser. No. 60/204,196, filed on May 12, 2000 entitled "Techniques and Features of an Internet File System", by David Long. The entire disclosure of both of these documents is hereby incorporated by reference in their entirety for all purposes as if fully set forth herein.

FIELD OF THE INVENTION

The present invention relates to Object Oriented inheritance and more specifically to associating attributes or methods with instances of a class on a per-instance basis.

BACKGROUND OF THE INVENTION

In Object Oriented programming, a subclass inherits the data structure (also known as the attributes) and behaviors (also known as the methods) from the subclass' superclass(es) (also known as parent classes). Frequently the term "properties" is used to collectively refer to attributes and methods. In the case of methods, the subclasses may either: (1) use the methods of the superclass as these methods are implemented in the superclass; or (2) the subclasses may override the methods of the superclass. In the case of attributes, the subclasses inherit the attributes of the subclasses' superclasses but there is no overriding of attributes. FIG. 1a is a block diagram that depicts a situation where (1) a method (e.g. "publish") is inherited and overridden; and (2) an attribute (e.g., string x) is inherited.

In discussing the case of methods with respect to FIG. 1a, assume that superclass 100 has a publish method. The implementation of the publish method in superclass 100 may involve emailing to a news group (hereinafter referred to as "publish by email to news group"). Subclasses 110 and 113 both override the publish method in superclass 100. For example, subclass 110 may implement the publish method by broadcasting (hereinafter referred to as "publish by broadcast") and subclass 113 may implement the publish method by opening it for review (hereinafter referred to as "publish by open for review"). Subclass 116 does not override the implementation of the publish method of superclass 100.

In overriding a method, the method in the subclass continues to have the same name as the method of the superclass. Only the implementation of the method in the subclass is different from the implementation in the superclass.

A class can be compared to a "cookie cutter". An instance (also known as an object) of a class can be thought of as dough that has been "stamped out" by this "cookie cutter" or class. Therefore, each instance of a class has all of the properties defined by the class that was used to "stamp out" that particular instance/object.

Each object has a "line of inheritance". In other words, object 111's line of inheritance starts with subclass 110 and is followed by superclass 100. If a particular method such as "publish" is requested of object 111, subclass 110 is first checked to see if the "publish" method is implemented in subclass 110. If the "publish" method type is implemented in subclass 110, that "publish" method implementation is used. Otherwise, the superclass 100 is checked to see if the "publish" method is implemented in superclass 100. Searching for the requested method "publish" continues up the "line of inheritance" until the requested method is found.

Furthermore, in Object Oriented programming, all instances of a particular class share common implementations of the methods of that class. In other words, objects 111 and 112 will have the same publish method implementation ("publish by broadcast"), which was obtained from subclass 110. Objects 114 and 115 will have the same publish method implementation ("publish by open for review"), which was obtained from subclass 113. Objects 117 and 118 will have the same publish method implementation, which was obtained from superclass 100 ("publish by email to news group").

In Object Oriented programming it is not possible for object 111 to have a different implementation of the publish method than object 112 because both object 111 and object 112 are instances of the same class, subclass 110. In other words, it is not possible with classic Object Oriented programming for object 111 to have a "publish by broadcast" implementation while object 112 has a "publish by open for review" implementation. Therefore, classic inheritance cannot be used to provide different implementations for a particular method for objects in the same class.

Subclasses cannot override attributes of their superclasses, but the subclasses may introduce additional attributes that do not belong to their superclasses. In discussing the case of attributes with respect to FIG. 1a, assume that superclass 100 has a string x, subclass 110 has a string y, subclass 113 has a string z, and subclass 116 does not introduce another string. In this situation, superclass 100 would only have string x. Subclass 110 would inherit string x from superclass 100 and in addition would introduce string y. Therefore, objects 111 and 112 would have string x and string y as attributes. Subclass 113 would inherit string x from superclass 100 and in addition would introduce string z. Therefore, objects 114 and 115 would have string x and string z. Subclass 116 would only inherit string x from superclass 100. Therefore objects 117 and 118 would only have string x.

In Object Oriented programming it is not possible for object 111 to have a different set of attributes than object 112 because both object 111 and object 112 are instances of the same class, subclass 110. In other words, it is not possible with classic Object Oriented programming for object 111 to have a string y but not string z, while object 112 has a string z but not a string y. Therefore, classic inheritance cannot be used to provide different attributes for instances of the same class.

SUMMARY OF THE INVENTION

Techniques are provided for associating methods and attributes with instances of classes on a per-instance basis. One technique for associating attributes with objects on a per-instance basis (hereinafter referred to as "per-instance attributes") involves the property class and the property bundle class. A second technique for associating attributes with objects on a per-instance basis involves categories wherein the object can be thought of as being "placed" into one or more categories. A technique for associating methods with objects on a per-instance basis (hereinafter referred to as "per-instance methods") is the policy mechanism. In any of these techniques, associating properties (i.e., methods and attributes) with objects on a per-instance basis may be used in any of the following ways:

1) different instances of the same class are associated with different properties where the properties are not in the class; and 2) two instances of two different classes are associated with the same property where the property is not in either of the two classes.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3a and 3b are block diagrams illustrating the concept of property class and property bundle class;

FIGS. 4a and 4b are block diagrams of property objects and property bundle objects;

FIG. 9 is a block diagram illustrating policy objects;

DETAILED DESCRIPTION OF THE INVENTION

A method and apparatus for associating policies with objects on a per-instance basis is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Since classic inheritance does not allow for instances of the same class to behave differently or have different attributes, there is a need for per-instance methods and attributes. Associating properties (i.e., methods and attributes) on a per-instance basis may be used in any of the following ways:

1) different instances of the same class are associated with different properties where the properties are not in the class; and 2) two instances of two different classes are associated with the same property where the property is not in either of the two classes.

Figure 2A:
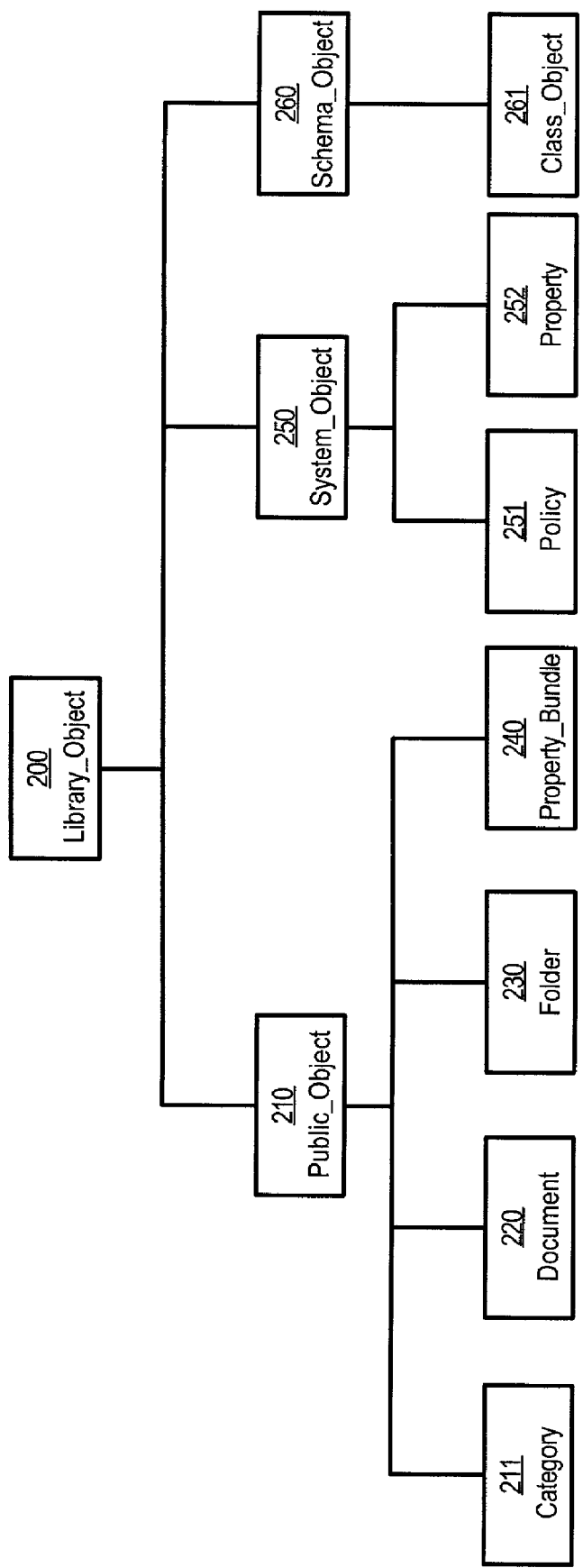
FIG. 2a is a block diagram of the first three levels of a class hierarchy.
Figure 2B:
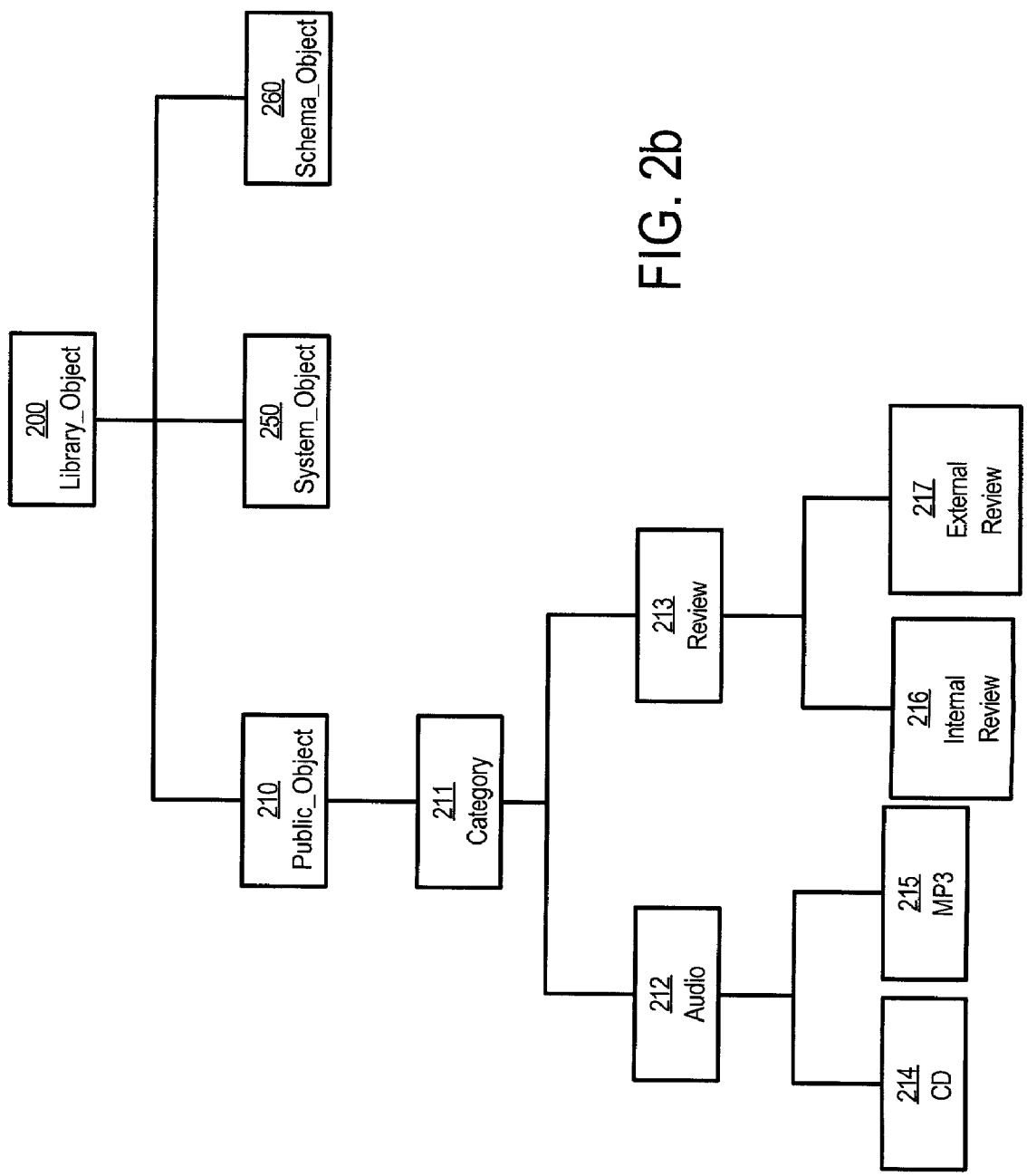
FIG. 2b is a block diagram of the class hierarchy concentrating on the category's aspect.
Figure 2C:
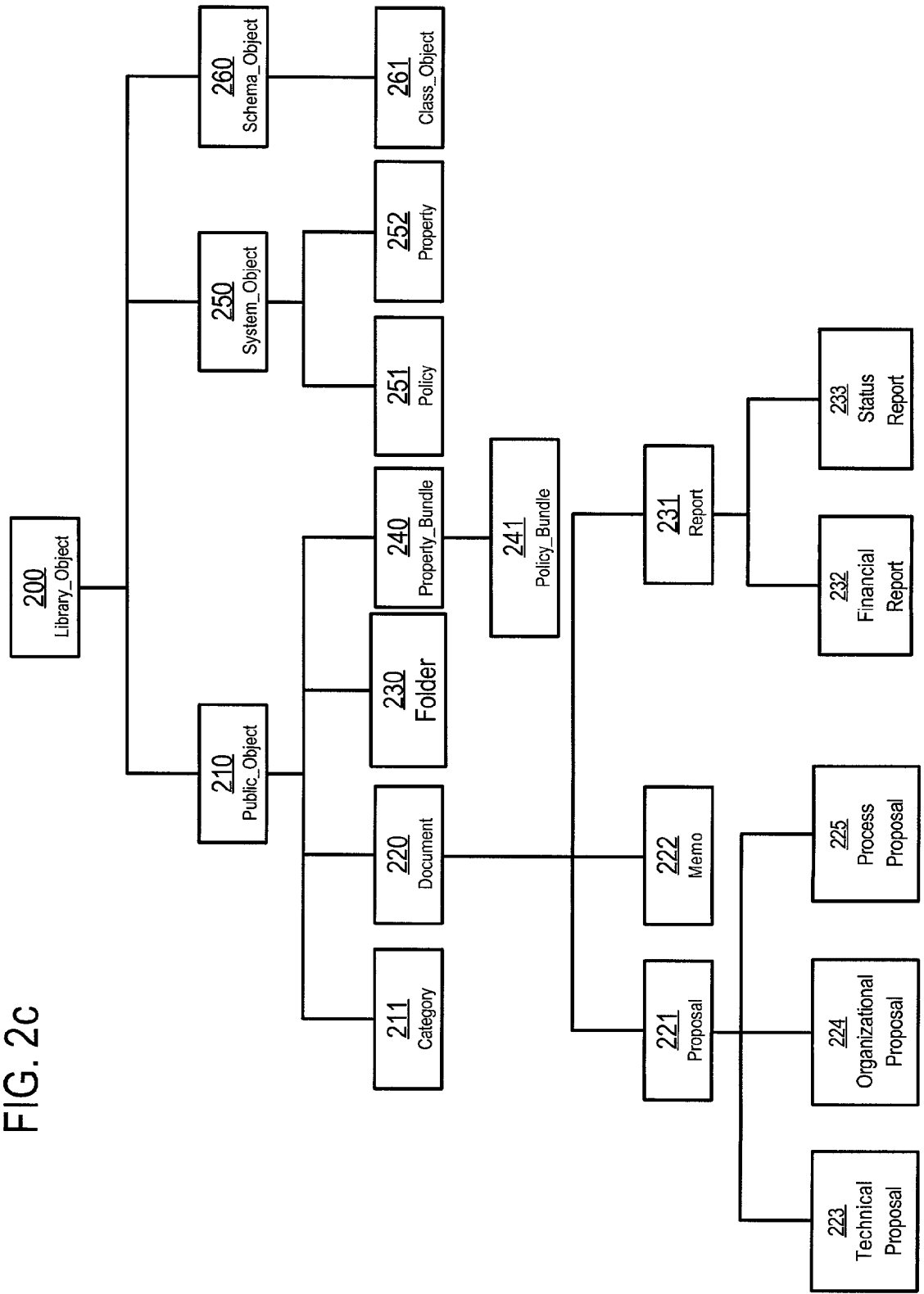
FIG. 2c is a block diagram of the class hierarchy concentrating on the policy aspect.

One technique for implementing per-instance attributes involves using a property class (refer to box 252 in FIG. 2c) and property bundle class (refer to box 240 in FIG. 2c).

A second mechanism for implementing per-instance attributes involves using categories, where an object inherits attributes associated with a category when the object is "placed in" the category.

Not only are per-instance attributes advantageous, but per-instance methods are also advantageous. One mechanism for providing per-instance methods involves using policies (hereinafter referred to as the "policy mechanism"). For a method whose implementation is determined by the policy mechanism, a request for execution of that method on a particular object causes this determination to proceed in three phases. In the first phase, it is determined whether that object itself explicitly specifies a particular implementation (such as "publish by email") for the requested method (such as "publish"). If so, that implementation is executed and processing stops. Otherwise, processing enters the second phase. In this second phase, each class in the object's "line of inheritance" is successively checked, commencing with the object's class, to see whether it specifies a particular implementation of the requested method. If so, that implementation is executed and processing stops. If no classes in the object's "line of inheritance" specify a particular implementation of the requested method, processing enters the third phase. In this third phase, a default implementation of the requested method is executed to satisfy the request.

Overview of the Property Class

A property class provides a mechanism for defining a property data as a <name, value> pair where the name is used as a key to identify the value. Examples of property data are the pairs:

1) <reviewer, David Pitfield>,

2) <effective date, 9/2/2001

3)<owner, pointer to a user object> where "David Pitfield", "9/2/2001", and "pointer to a user object" are values and "reviewer", "effective date", and "owner" are names that indicate what the values are for.

Overview of the Property Bundle Class

A property bundle class provides a mechanism for aggregating a set of property objects and associating this set of property objects with a particular object. For example, it may be advantageous to associate with an instance of a document a reviewer, an effective date of the review, and an owner of the document, in which case property data as described herein above would be associated with this instance of a document via a property bundle.

Overview of the Category Class

A category class provides a mechanism for categorizing an object. An example of an object that can be categorized is a document object. Examples of categories that a document object can be placed in are "internal review" and "CD", where the document is to be internally reviewed and is on a CD format.

Overview of the Policy and Policy Bundle Classes

Figure 1A:
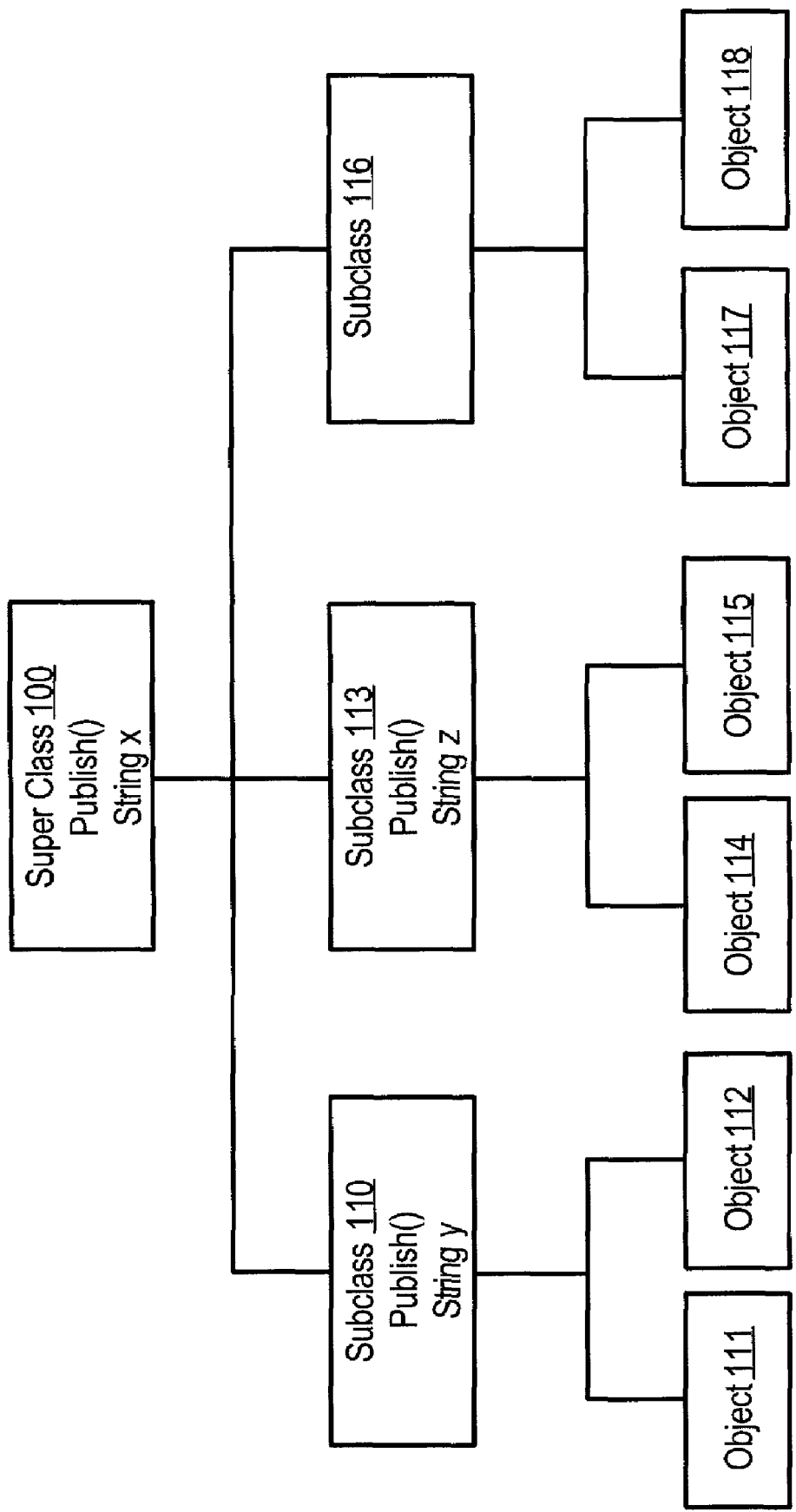
FIG. 1a is a block diagram illustrating inheritance of methods and attributes in conventional Object Oriented programming.
Figure 1B:
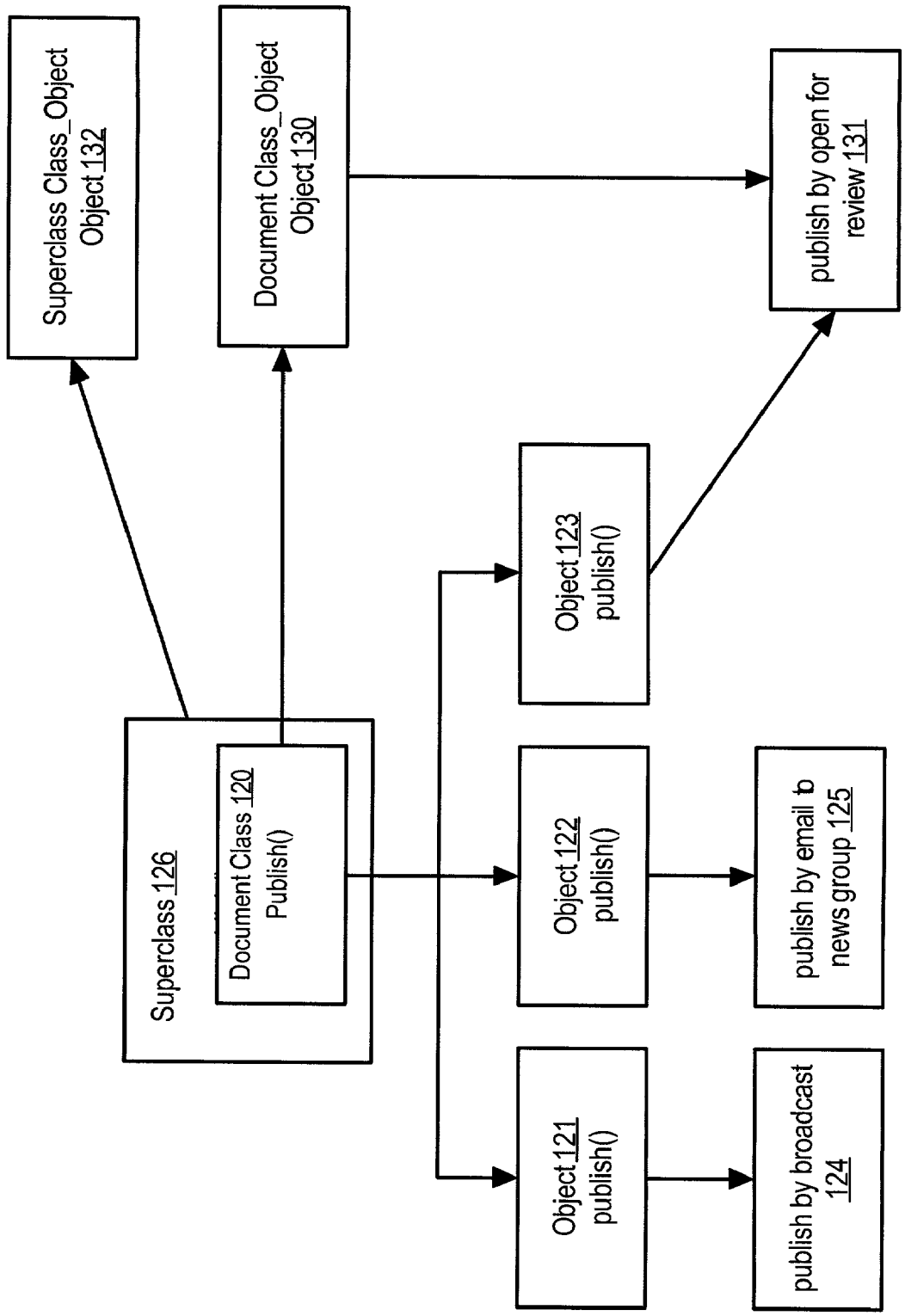
FIG. 1b is a block diagram illustrating major classes, objects, and relationships involved in the first and second phase of the policy mechanism.

The policy mechanism uses the policy class and the policy bundle class. FIG. 1b is a block diagram illustrating major classes, objects, and relationships involved in the first and second phase of the policy mechanism.

In the first phase of the policy mechanism, assume there is a document class 120 with a publish method. And there are two instances of this document class (document object 121 and document object 122). Therefore, both document object 121 and document object 122 have a publish method whose implementation is that of the publish method of the document class 120. However, there may be a need to implement the publish method differently between document object 121 and document object 122. Therefore, via the policy mechanism document object 121 may explicitly specify a publish by broadcast 124 implementation of the publish method type. Whereas document object 122 may explicitly specify a publish by email to "news group" 125 implementation of the publish method type.

In the second phase of the policy mechanism, implementation of a requested method can be specified via the object's line of inheritance. For example, assume that superclass 126 is the super class of document class 120 and there is a third instance of the document class 120 (i.e., document object 123) that does not explicitly specify an implementation of the publish method. Therefore, the policy mechanism goes to the second phase to check if there is an implementation of the publish method type associated with the document class 120's line of inheritance. One approach for doing so involves maintaining, for each class, metadata specifying the implementation, if any, of each policy-driven method to be used by instances of that class in the second phase of the policy mechanism. One approach to maintaining this metadata is for each class to have an associated object to store its metadata. This associated object is an instance of the "class object" class, and is therefore referred to as the "class object" object of that class.

FIG. 1b portrays a high level example of classes, objects, and relationships between these classes used in the second phase of the policy mechanism. Document class_object object 130 is an example of a class_object object associated with document class 120 and is used to define the policy-driven behavior of document class 120. Superclass class_object object 132 is a class_object object associated with superclass 126 and is used to "define the policy-driven behavior of" superclass 126. Associated with document class_object object 130 is the publish by open for review 131 implementation of the publish method type. Therefore document object 123 uses the publish method type implementation (e.g., publish by open review 131) that is associated with document class_object object 130. However, if document class_object object 130 did not have a publish method type implementation (e.g., publish by open review 131) then the second phase would proceed to check the rest of the class object objects in document class 120's line of inheritance, of which superclass class_object object 132 is the next in the line of inheritance to be checked.

Class Hierarchy

According to one embodiment, the classes used to provide per-instance properties (e.g., the property class, property bundle class, category class, policy class, and policy bundle class) are related to each other through a class hierarchy. FIGS. 2a, 2b, and 2c illustrate an embodiment of a class hierarchy that includes classes for providing per-instance properties. Because of the difficulty of showing all of the class hierarchy on one figure, the class hierarchy is depicted in three block diagrams: FIG. 2a, FIG. 2b, and FIG. 2c. FIG. 2a shows the three top levels of the class hierarchy. Furthermore, FIG. 2a shows the subclasses (i.e., property_bundle class 240 and property class 252) involved in the property technique. FIG. 2b concentrates on showing the part of the class hierarchy involved in the category technique. FIG. 2c concentrates on showing the part of the class hierarchy involved in the policy technique.

Library_object class 200 is the superclass for all classes in the class hierarchy. There are three major subclasses of library_object class 200: public_object class 210, system_object class 250, and schema_object class 260 (hereinafter referred to as the "three superclasses"). Associated with library_object class 200 is a unique_object_ID attribute, which all the classes in this class hierarchy inherit. The unique_object_ID is a unique identifier of all objects created using classes in this class hierarchy. Among other things, the unique_object_ID is used for identifying objects and for retrieving objects, which are stored in the form of tables and rows, from a database.

A user may create classes (hereinafter referred to as "user defined subclasses"). One technique for creating classes is by having the "user defined subclass" be a subclass of any one of the classes in the class hierarchy. As depicted, all classes in the class hierarchy are subclasses of the library_object class 200 and therefore, all classes including "user defined subclasses", in the class hierarchy have a unique_object_ID.

Each object also has a class_ID attribute. The class_ID attribute identifies the class of an object. In other words, if there are 60 classes in the class hierarchy, there will be 60 distinct class_IDs to identify each of the 60 classes. The class_ID, among other things, is used to retrieve objects from and store objects to a database, and in retrieving objects from a database, to know their type.

The naming convention for instances of the classes that are shown in the class hierarchy figures will start with the name of the class and be followed with "object". For example, an instance of the document class 220 will be referred to hereinafter as a "document object".

Extensible File System

While many of the examples given here refer to classes in the more generic sense, one implementation of these techniques is within the context of an extensible file system. For example each of the classes in the class hierarchy depicted in FIG. 2 may represent a type of item stored in an extensible file system where such types represent folders in a file system, documents in the file system, users in the file system, etc. Furthermore the classes in the class hierarchy can be sub-classed. For example, the document class can be further sub-classed to represent the type of document—memo, report, spread sheet, etc.

Object Relational Mapping System

The objects that are instances of the various classes in the class hierarchy or other objects that are related to these objects may be "stored" in a database. Since databases store data in the form of rows, columns, and tables, objects are "mapped" to rows, columns, and tables of the database. Mapping objects to database rows, columns, and tables allows software to: (1) store the data from an object into a database (hereinafter referred to as "storing objects into a database"), (2) retrieve data from a database, which is then placed in an object (hereinafter referred to as "retrieving objects from a database"), and (3) operate on an object via the object's methods, where the operation results in a change in the rows, columns and tables of the database that are mapped to the object being modified.

One technique for using a database to store, retrieve, and modify such objects is to use an "object relational mapping system". An "object relational mapping system" involves mapping relational tables in the database to objects in such a way that the objects preserve the identity of the database rows. When operating on an object, the object relational mapping system is used determine which database table and which database row(s) in that database table must be modified in order to perform the operation.

The class_ID is used in conjunction with an "object relational mapping system" to know: (1) what object to construct when retrieving data from a database; and (2) what tables and rows in the table to update when storing data from an object to a database. One technique that may be used in an "object relational mapping system" is to have a class_ID exist as a column in a database table.

Concept of Properties and Property Bundles

Figure 3B:
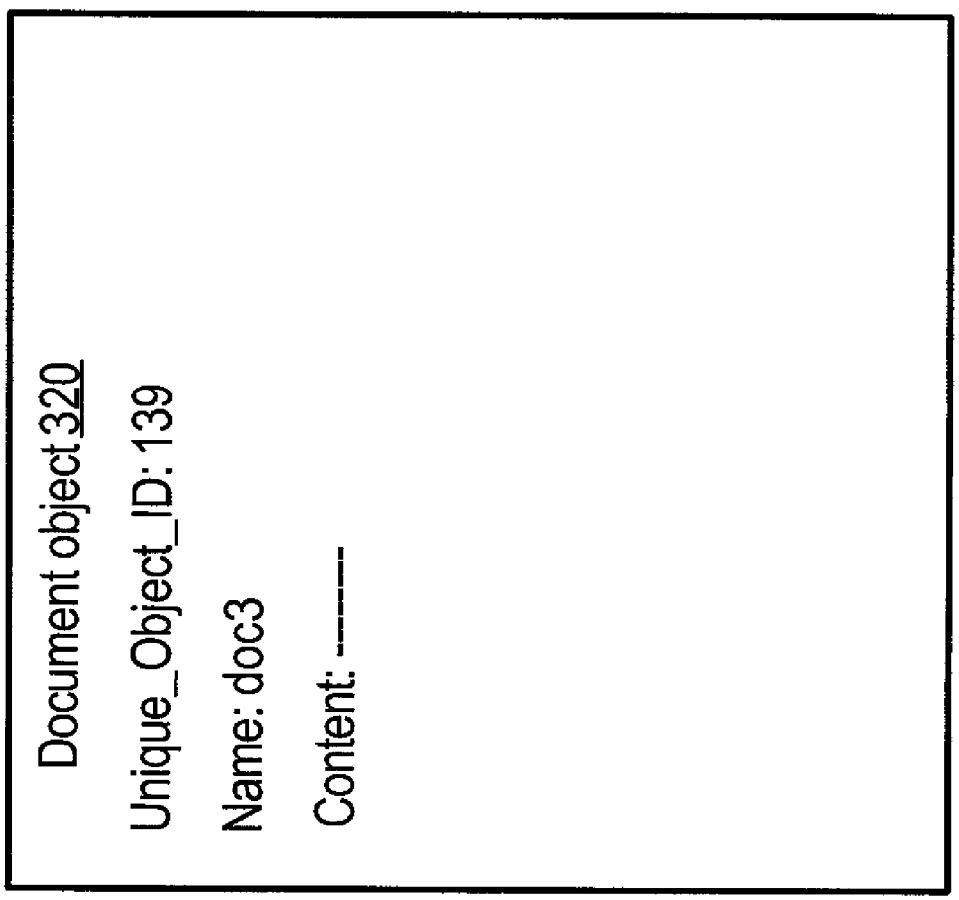

FIGS. 3a and 3b are block diagrams depicting a conceptual picture of how the property technique, which involves the property class 252 and the property bundle class 240, works. Although property objects and property bundle objects may be associated with a number of different kinds of objects, the document class 220 will be used for demonstrating the concept of the property technique. For the sake of example, the document class 220 has attributes of: (1) unique_object_ID, which is inherited from library_object class 200; (2) name of the document; and (3) document contents. Since an instance of the document class 220 has all attributes of the document class 220, document objects 300, 310, and 320 all have document class 220's attributes.

One technique for associating property bundle objects with instances of a class is to have a property bundle attribute in the class. Then subclasses of that class will inherit the property bundle attribute. Furthermore, any instances of that class or any instances of any subclasses of that class will have the property bundle attribute. For example, the property bundle attribute may be introduced in the "three superclasses": public_object class 210, system_object class 250, and schema_object class 260. Therefore, any subclass of the "three superclasses" will have a property bundle attribute.

Assuming that property bundle is introduced as an attribute in the "three superclasses," all objects that are instances of any of the "three superclasses" will have a property bundle attribute, and the property bundle attribute of each object may be assigned a property bundle object (such as 301 and 311) as can be seen with document objects 300 and 310. Furthermore, since document class 220 is a subclass of public_object class 210, document object 300 has a property bundle 301 as depicted in FIG. 3a. However, a document object is not required to have a property bundle as is illustrated by document object 320.

As depicted in FIGS. 3a and 3b, there is a one-to-many relationship between property bundle objects and property objects. In other words, for each property bundle object there may be one or more property objects. Examples of data in property objects are the <key, value> pairs where the <key, value> pairs are <reviewer, David Pitfleld>, <effective date, 9/2/2001>, <owner, pointer to user object>, etc.

Implementation of Properties and Property Bundles

Figure 4A:
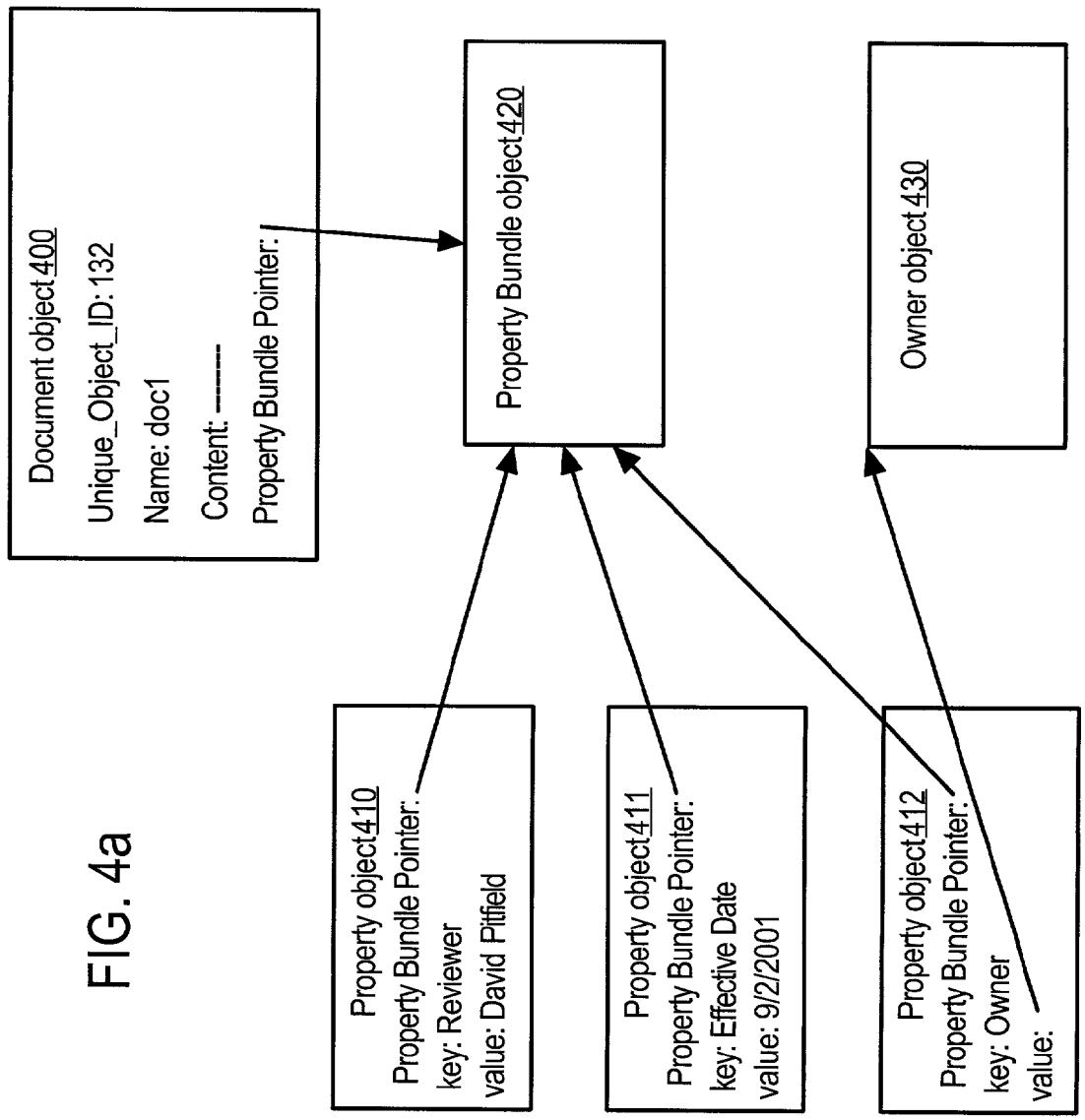

FIGS. 4a and 4b are block diagrams depicting one way to implement the property technique. The document class 220 is used for demonstrating a technique for using the property class and property bundle class. As was seen previously, the objects (400 and 440) have document class 220's attributes.

As already stated, a property bundle attribute may be introduced as an attribute in the "three superclasses". There are various ways that the property bundle may be implemented as an attribute of the "three superclasses". These implementations include but are not limited to: (1) pointer to property_bundle object (2) reference to a property_bundle object; and (3) property_bundle as a table.

Assume that property bundle is implemented as a pointer to an instance of the property_bundle class 240 in the public_object class 210. Since document object 400 is an instance of public_object class 210, document object 400 will have a pointer to an object of type property_bundle 240. Document object 400 has the property_bundle pointer initialized to point to property bundle object 420, which is an instance of the property_bundle class 240.

Instead of the property bundle object 420 pointing to the instances of property class 252 (410, 411, and 412), the instances of property class 252 (410, 411, and 412) point to property_bundle object 420. If a program has a document object and needs to gain access to the property objects associated with that document object, database queries using an "object relational mapping system" (in conjunction with using the unique_object_ID and the class_ID) will enable access to the desired tables and rows. Since there is no requirement for an instance of the "three superclasses" to implement a property bundle, the property bundle pointer/reference may be initialized to "Null" as seen in FIG. 4b.

One technique for implementing instances of property class 252 is to use <key, value> pairs where the key identifies the value. One way to implement the key is to use a string. An example of a property object is the <key, value> pair <reviewer, David Pitfield> as depicted in document object 300. The "value" may be implemented as data types such as string, date, integer, pointer/reference. Examples of strings for "values" are "David Pitfield" and "David Long". Examples of dates as "values" are "9/2/2001" and "9/12/2001". An example of pointers/references as "values" is the pointer to user object 430. Furthermore, the pointer/reference may point to or reference an instance of a class in the class hierarchy. Therefore, the owner object 430 may be an instance of a class in the class hierarchy. Furthermore, the owner object 430 may be an instance of a "user defined subclass".

One technique for aggregating property objects is to have one property bundle object for a set of property objects. However, property bundles can also be implemented as tables or hash tables as is described hereinafter. The tables contain a row or entry for the same data that would be in a property object if property objects were used

Tables and Hash Tables

One technique for aggregating a set of items is to use tables. In the following example, a table is used for aggregating items that are <key, value> pairs by placing each <key, value> pair in a separate row. Each row is referred to as an "entry" in the table.

| Key | Value |
| --- | --- |
| Reviewer | David Pitfield |
| Effective Date | Sep. 20, 2001 |
| Duration | 51 minutes |

Assume that a user wants to modify the value in the second entry from 9/2/2001 to 10/2/2001. To do this, the user would specify, for example by clicking on a button or entering "Effective Date" in a field, that he wants to modify the effective date in the above table. The computer software would use this user entered key (e.g. "Effective Date") to locate the second row in the above table. The user would also enter the new Effective Date value 10/2/2001 to replace 9/2/2001. When the software locates the second row using the user entered data, the software replaces the 9/2/2001 with the 10/2/2001 that the user also entered.

A particular type of table is a hash table. If the table in question is a hash table then the user entered key is hashed by a hashing algorithm resulting a hash key. The hash key is used to efficiently locate the desired value in the hash table. For example, the user enters "Effective Date" either by clicking on a button or entering a value into a field. Then the string "Effective Date" is hashed resulting in a hash key where this hash key is used to locate the entry containing 9/2/2001 in the hash table.

Property Bundles Implemented as Tables or Hash Tables

As already stated, property bundles aggregate one or more property objects for the purpose of associating them with another object such as a document. One technique for implementing property bundles is to use tables where the <key, value> pairs that would be in property objects are instead entries in tables. The table key is a string that identifies the value as depicted in property bundles 301 and 311. Furthermore, the table can be a hash table.

Data Checking and the Property Class

There are a couple of aspects to data checking. One aspect is provided by the programming language when data is assigned to a variable, such as an attribute, where the variable is of a particular data type (hereinafter referred to as data type rules). A second aspect involves rules that can be programmed into the software to provide additional data checking before assigning data to an attribute (hereinafter referred to as software rules).

As already stated, the data that is used to initialize the <key, value> pair is entered by a user and the user is allowed flexibility in entering this data (hereinafter referred to as "user defined keys"). One part of providing flexibility to the user is to not check the keys according to software rules.

Object oriented programming allows attributes to be "private." The value of private attributes cannot be set directly and therefore must be set using methods specifically for that purpose. Since these private attributes are set only using methods, these methods can be used to perform additional data checking on the private attribute. In other words, assume that a method called set_key is used to set the key attribute. When a user enters data "reviewer" into the computer, the computer program invokes the set_key method with the following instruction:

set_key("reviewer")

When the set_key method is invoked and passed the user specified value "reviewer", the set_key method can simply assign "reviewer" to the key attribute thus allowing the user flexibility in entering data. Setting a key attribute to a user specified value shall be referred herein as a "user defined key".

In contrast if software rules were desired, the set_key method could use software rules to determine if the value "reviewer" is acceptable data before setting the key attribute. In other words, the software rules would accept certain keys and reject other keys. For example, these rules could indicate that the "reviewer" key is acceptable but the "effective date" key is not acceptable. In which case, if the set_key method is passed "effective date" the key would not be set. This is referred to as "predefined keys". However, the goal with the property class is to provide user flexibility in entering data. Therefore, the keys are typically user defined rather than being predefined.

Data Modeling Flexibility

Figure 5:
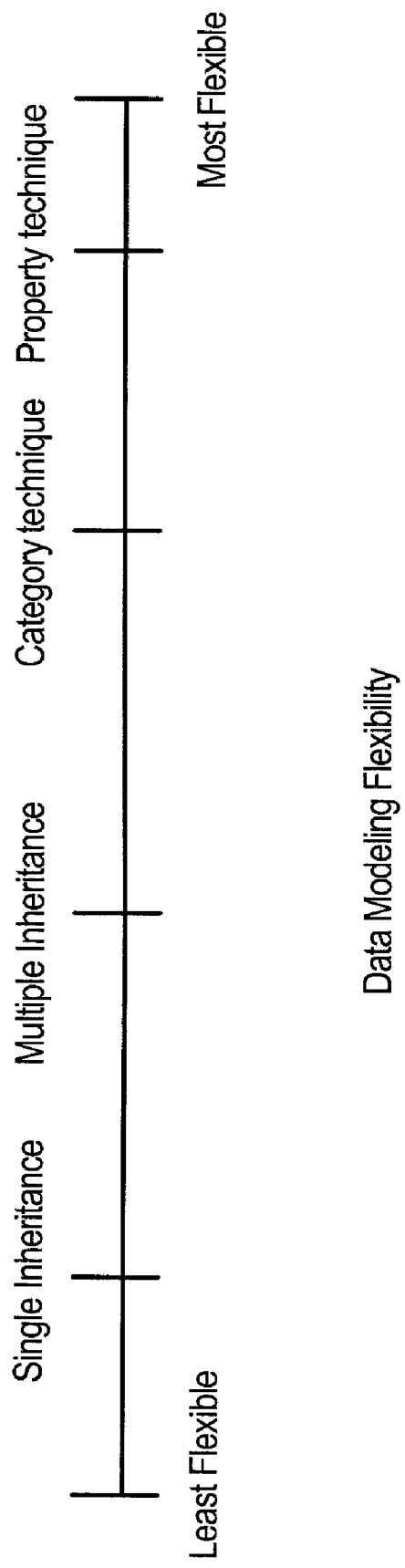
FIG. 5 illustrates data modeling flexibility with respect to inheritance, the category technique, and the property technique.

FIG. 5 depicts a continuum of data modeling flexibility with respect to: (1) single inheritance; (2) multiple inheritance; (3) the category technique; and (4) the property technique. Single inheritance is the least flexible because an object is restricted to having the attributes defined in the object's class and superclasses. Multiple inheritance is more flexible than single inheritance because an object is not restricted to having attributes defined in only one "line of inheritance" class. The property technique is more flexible than either single inheritance or multiple inheritance because the attributes of an object are not restricted in any way by the attributes defined by the object's class and superclasses.

However, there is a big gap in the levels of flexibility available between multiple inheritance and the property technique as can be seen in FIG. 5. The purpose of the category technique is to offer another level of flexibility in between what multiple inheritance and the property technique offer.

The category technique is similar to multiple inheritance in that: (1) multiple categories may be associated with an object; and (2) data checking of the names and values of attributes is provided. The category technique is similar to the property technique in that the category technique provides attributes on a per-instance basis rather than a per-class basis.

Categories and the Class Hierarchy

Figure 6:
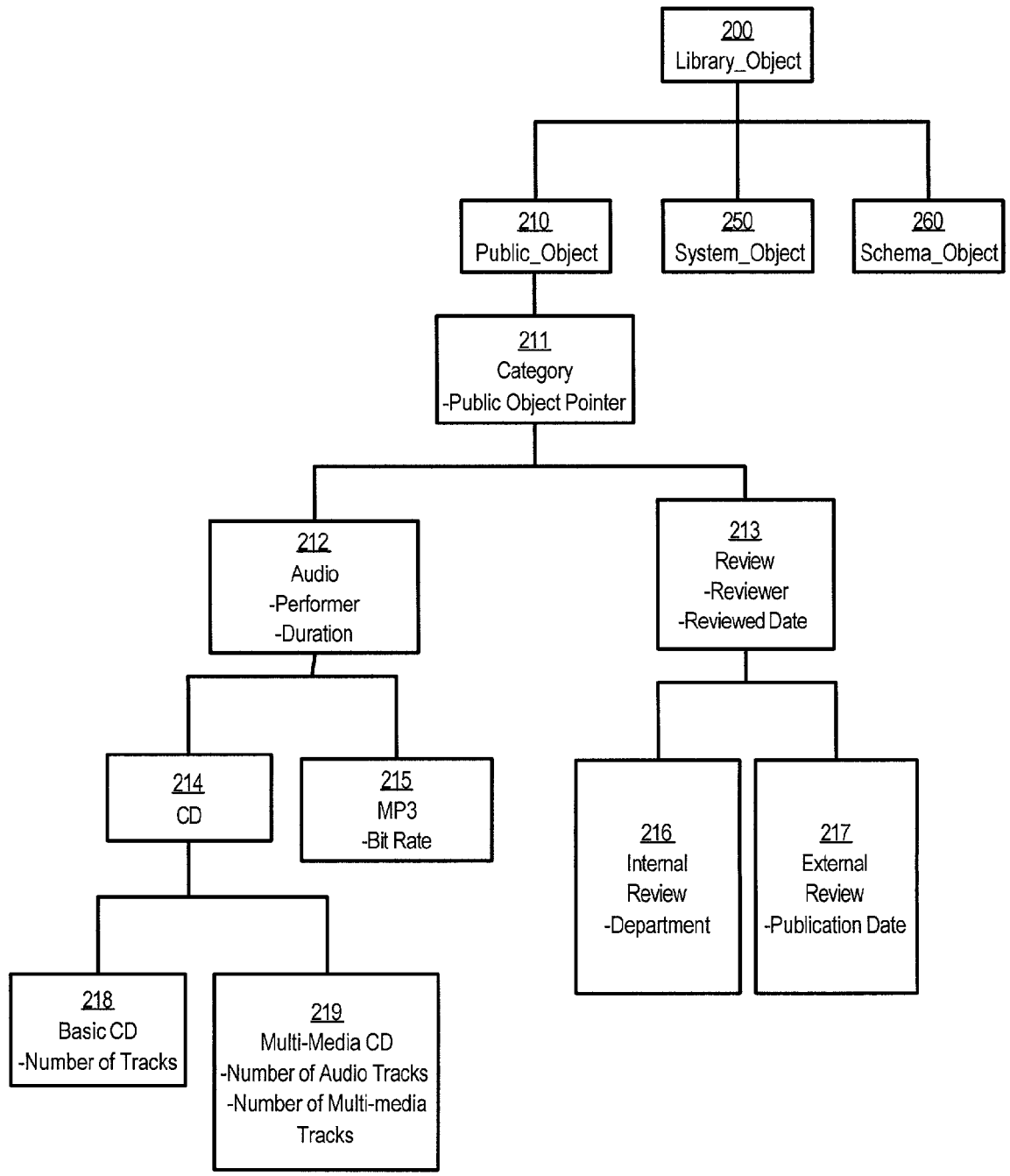
FIG. 6 is a block diagram illustrating the same classes in FIG. 2b along with examples of possible attributes.

FIG. 6 is a block diagram that is identical to FIG. 2*b* except that FIG. 6 provides examples of possible attributes associated with various classes in FIG. 6. As mentioned before, users may customize the class hierarchy with "user defined subclasses". FIG. 6 depicts eight such "user defined subclasses" (212, 213, 214, 215, 216, 217, 218 and 219). The eight "user defined subclasses" provide two types of structured information: (1) audio 212; and (2) review 213. The classes audio 212 and review 213 are further subclassed.

Since an audio can be either a CD or an MP3, the audio class 212 is subclassed with both a CD class 214 and an MP3 class 215. Since a CD can be either basic format or multi-media, the CD class 214 is subclassed with both a basic CD class 218 and a multi-media CD class 219. Likewise, since a review can be either an internal review or an external review, the review class 213 is subclassed with both an internal review class 216 and an external review class 217.

One technique for implementing categories is for all of the eight "user defined subclasses" to inherit a public_object pointer from category class 211. The eight "user defined subclasses" also introduce attributes as depicted in the individual boxes of the eight "user defined subclasses" in FIG. 6. For example, attributes "performer" and "duration" may be associated with an audio class 212. A review class 213 may have a "reviewer" and a "review date". An internal review class 216 may have a "department."

Although a public_object pointer in category class 211 is used in this example for implementing the policy technique, other well known techniques for associating objects with other objects may be used. Such other techniques include but are not limited to references, tables, and data in files.

Placing Objects in Categories

Figure 7A:
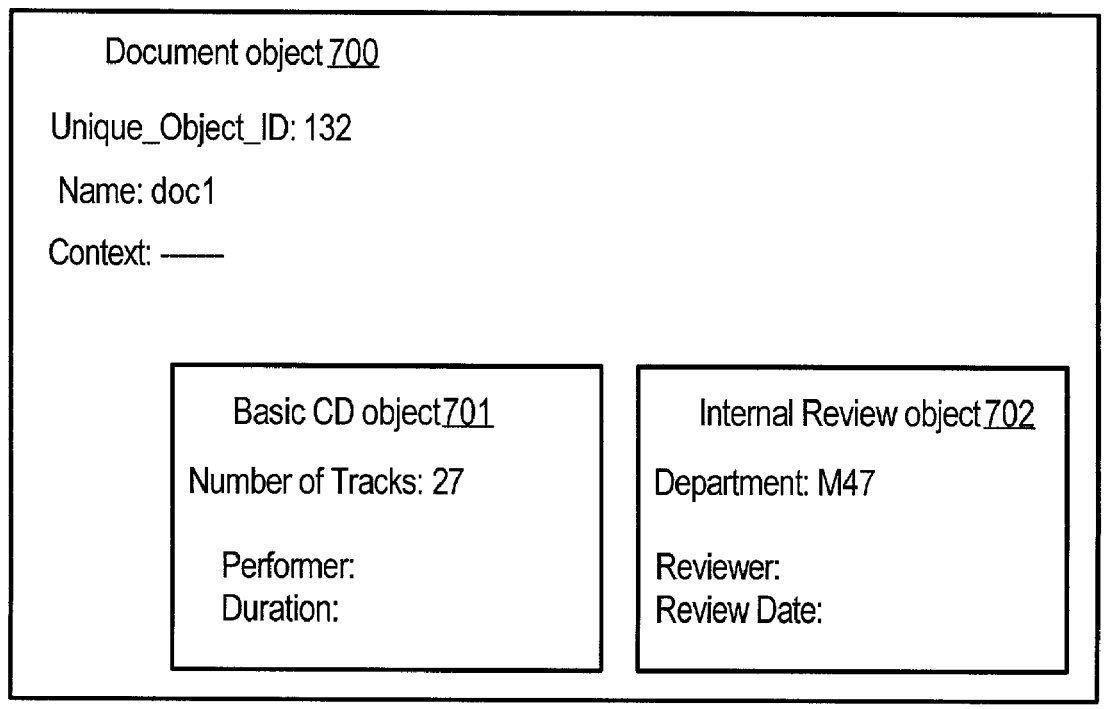
FIG. 7a is a block diagram illustrating the concept of categories.

As stated before, one technique for "placing" objects in categories is for the category class 211 to have a pointer to public_object class 210. Therefore, objects or instantiations of the public_object class 210 may be placed in any number of categories. FIG. 7a is an example of a document object, which is on a basic CD format, and where an internal review will be performed on the document. Therefore, the document object 700 (an instance of document class 220) in question is placed in the basic CD category, using basic CD object 701, and the internal review category, using the internal review object 702. Placing document object 700 into the basic CD and internal review categories is accomplished by associating category objects 701 and 702, which are instances of classes 218 and 216 respectively, with document object 700.

Figure 7B:
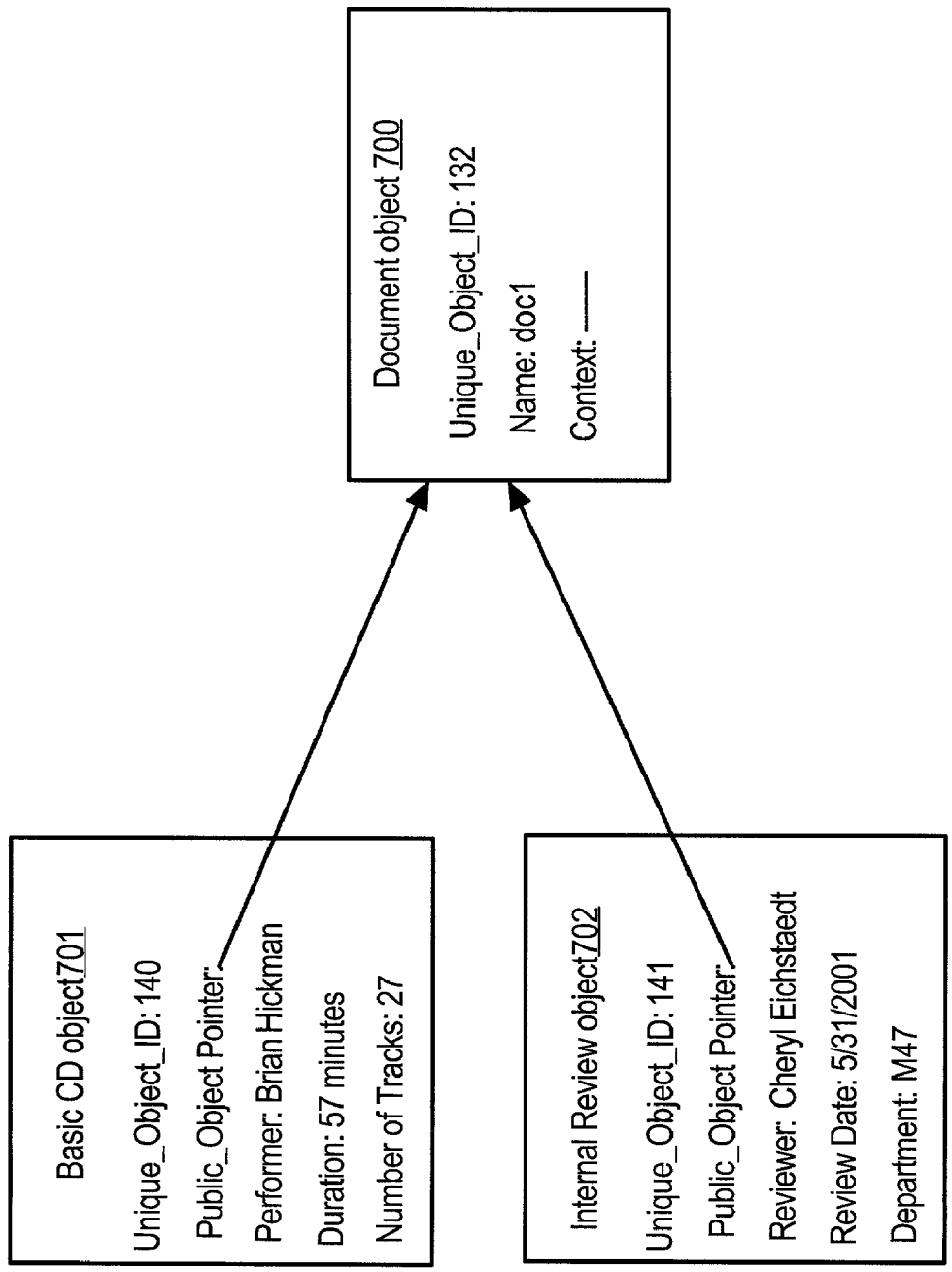
FIG. 7b is a block diagram illustrating category objects.

FIG. 7b is a block diagram depicting an implementation of the conceptual picture shown in FIG. 7a. Since document object 700 is an instance of public_object class 210, public_object pointers may be used to associate category objects (701 and 702) with a document object. In FIG. 7b, the two object categories (1) basic CD object 701 and (2) internal review object 702 are associated with document object 700 via public_object pointers in objects 701 and 702. Although objects 700, 701, and 702 inherit all the properties of the respective superclasses of objects 700, 701, and 702, these inherited properties are not all shown for the sake of brevity and clarity.

Although in this example the categorized object, document object 700, is an instance of public_object class 210 there is no reason to prevent one from categorizing objects according to another scheme. Furthermore, other mechanisms besides pointers, such as references, tables, or data in files may be used for "placing" objects (such as a document) into one or more categories (such as CD and internal review).

Categories and Data Checking

As stated before, the category technique provides increased data checking. When a category subclass is defined, the attributes of the category subclass are also defined. The defining of the category subclass's attributes provides for validation of the category subclass's attributes in accordance with the category subclass.

For example Internal Review Object 702 is an instance of class 216 where class 216 is a subclass of class 213. Therefore, Internal Object 702 has the reviewer and review date attributes from class 213 and the department attribute from class 216. Assuming that:

a) the reviewer attribute is implemented as a string data type, b) review date is implemented as integer data types (e.g., one integer for the day, one integer for the month, and one integer for the year), and c) the department is implemented as a string data type.

When values are assigned to the reviewer, review date, and department attributes, the values assigned to these attributes must conform to the respective data types. For example, when "M47" is assigned to the Department attribute, which is a string data type, the value "M47" is checked to determine if value "M47" conforms to the string data type. This is what previously has been referred to as data type rules.

Additionally, object oriented programming allows attributes to be private. Private attributes cannot be set directly and therefore must be set using methods specifically for setting the private attribute. Since these private attributes are set using methods, these methods can be used to perform additional data checking on the private attribute. (Using methods to perform additional data checking is an example of using software rules.) In other words, assume that a method called set_department is used to set the department attribute. Then a program invokes the set_department method with the following instruction:

set_department("M47")

When the set_department method is invoked and passed the parameter "M47", which is to be used to initialize the department attribute, the set_department method can perform additional data checking on the "M47" string before assigning the "M47" string to the department attribute. For example, the set_department method can check to see if "M47" is a valid department. In the case of the review date attribute, a set_review_date method could check to determine if the date passed was a proper date. For example, it may be desirable for a date to be in the format mm/dd/yyyy rather than dd/mm/yy.

Categories and Tables

Figure 8:
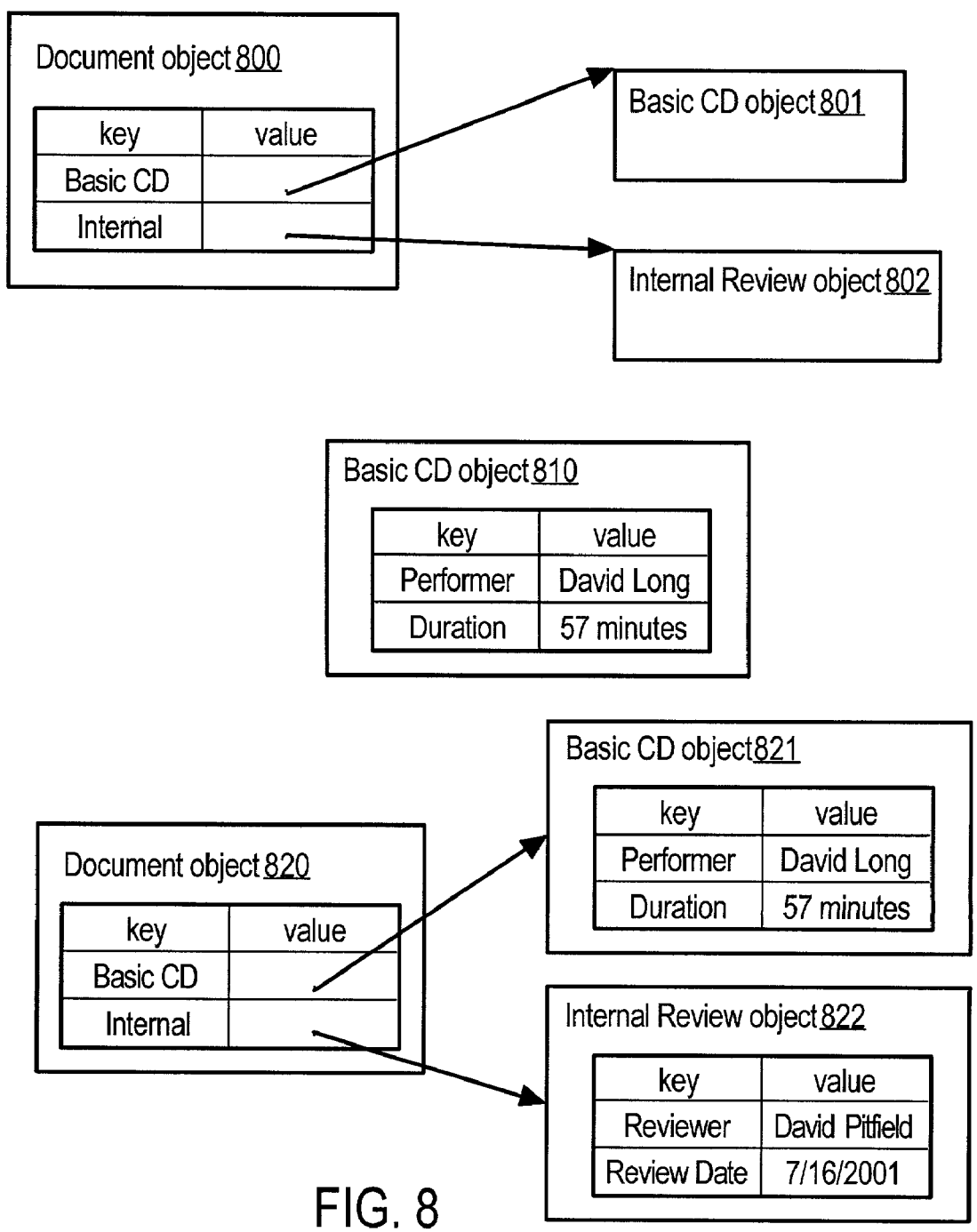
FIG. 8 is a block diagram illustrating category objects with tables.

FIG. 8 is a block diagram of how tables may be used when categories are brought into memory from a database. Different techniques for using tables may be used depending on whether the table is: (1) a part of a categorized object; and/or (2) a part of the category object.

In the first technique, the table key is the type of category and the value is a pointer to the category object in memory. For example a document object 800 may have a table as a part of the document object 800. Furthermore, in this technique an example of a key is the category type such as basic CD, and the value for the basic CD is a pointer to the basic CD object 801 in memory. Document object 800 is associated with two category objects 801 and 802.

In the second technique, the table key is the name of the category object's attributes and the value is the value associated with the category object's attributes. An example of a category object is a basic CD object 810, in which case examples of keys would be "performer" or "duration" where "performer" and "duration" are attributes associated with basic CD class 218 due to inheritance from audio class 212.

The value associated with the "performer" key would be "David Long" and the value associated with the "duration" key would be "57 minutes".

The above two techniques for using tables with categories may be combined or the two techniques may be used separately. The two techniques are combined as depicted in document object 820, basic CD object 821 and internal object 822. The first technique is used with document object 820. The second technique is used with basic CD object 821 and internal object 822. As previously discussed, tables can be implemented as hash tables.

Policies

One technique for implementing per-instance methods is the policy mechanism, which uses the policy class 251 and the policy bundle class 241. A policy provides a mechanism defining a <method, method implementation> pair (hereinafter referred to as a "policy object").

A policy bundle is a technique for aggregating a set of policies, and associating them with (1) a particular object, and/or (2) a class.

FIG. 9 is a block diagram of eight policy objects. There are four policy objects (901, 902, 903, 904) of method "publish". Each of the policy objects (901, 902, 903, 904) have different method implementations for the method "publish". There are also four policy objects (905, 906, 907, 908) of method type "delete". The method type "delete" also has four method implementations.

Policy Bundles

Figure 10A:
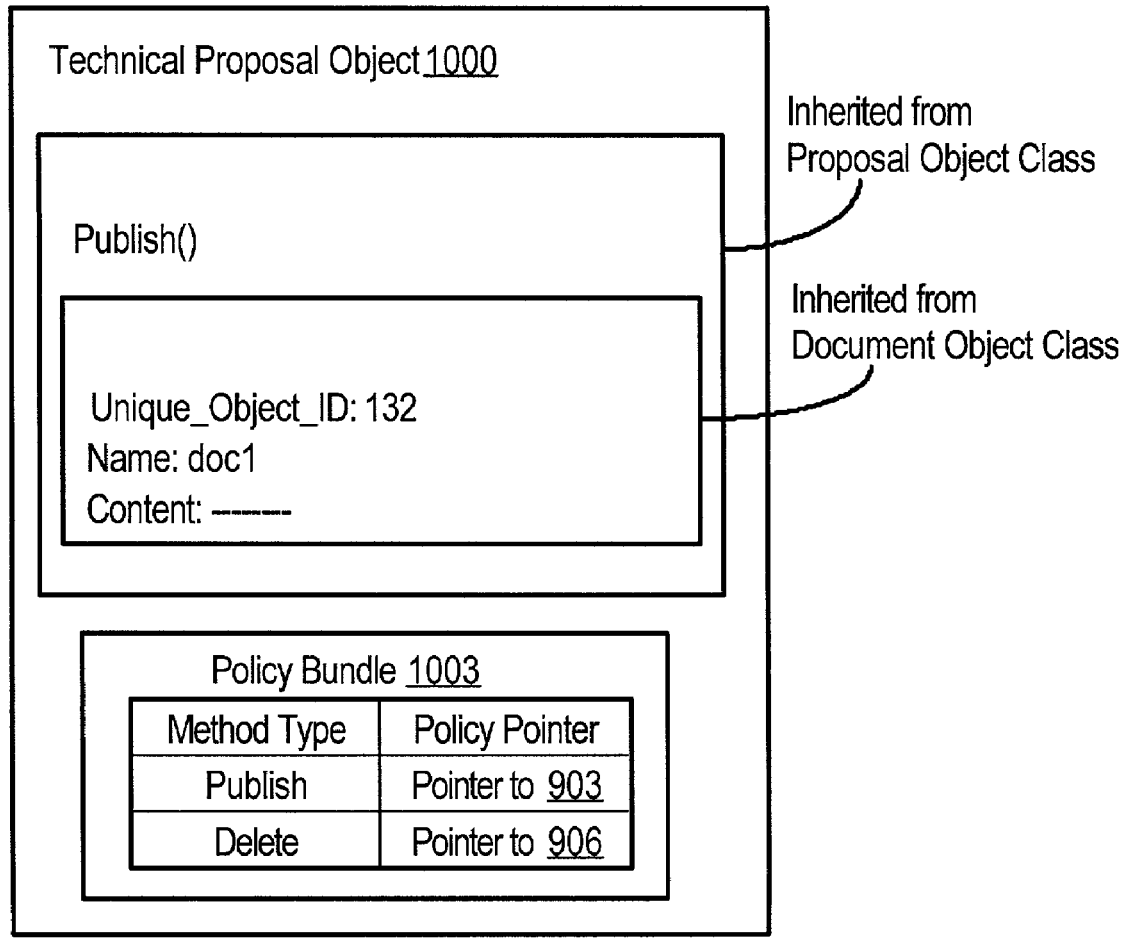
FIGS. 10a and 10b are block diagrams illustrating objects associated with policies and policy bundles.
Figure 10B:
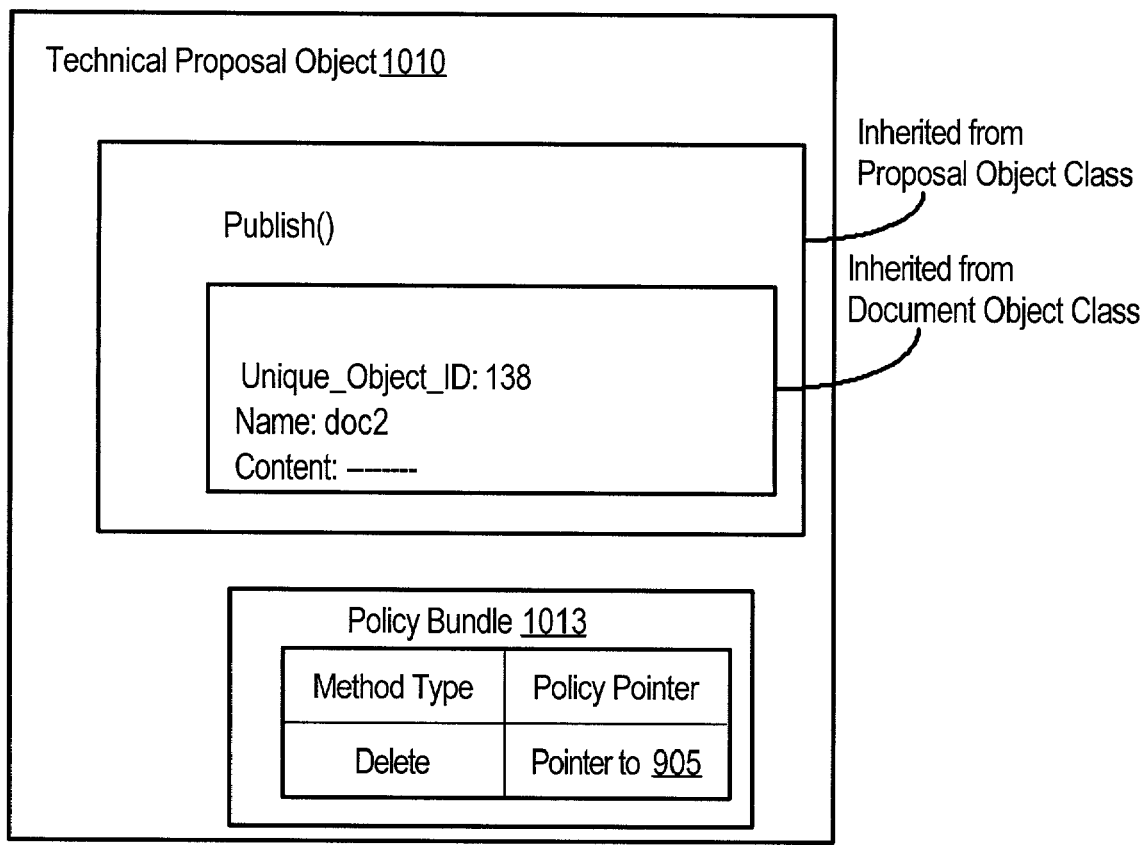

FIGS. 10a and 10b are block diagrams of objects that are associated with policies through a policy bundle. A policy object is an instantiation of policy class 251. A policy bundle object (such as 1003, and 1013) is an instantiation of policy_bundle class 241.

For the sake of illustration, a policy bundle may be implemented as a pointer to an instance of the policy_bundle class 240 where the policy bundle pointer is introduced as an attribute in the "three superclasses". Therefore, all of the subclasses of the "three superclasses" inherit the policy bundle pointer.

One technique for enabling policy_bundle objects to aggregate <method, method implementation> pairs is for the policy_bundle class 241 to be associated with a list of <string, policy pointer> pairs. The "string" identifies the method (such as "publish") and the "policy pointer" points to a policy object (such as 901, 902, 903, 904, 905, 906, 907, or 908 in FIG. 9). Another technique for enabling policy_bundles is to use hash tables where the method is inputted to a hashing algorithm to obtain a key and the policy pointer is the value associated with the key. A third technique involves pointers/references similar to the property_bundle implementation in FIG. 4a.

Self Describing Class Hierarchy

One approach for implementing the second phase of the policy mechanism is to maintain, for each class, metadata describing the implementation, if any, of each policy-driven method to be used by instances of that class in the second phase of the policy mechanism. On approach to maintaining this metadata is for each class to have an associated object to store its metadata. This associated object is an instance of the "class object" class 261, and is therefore referred to as the "class object" object of that class. For example, an entire class hierarchy, as represented in FIGS. 2a, 2b, and 2c, may be represented with a list of instances of the class_object class 261 (hereinafter referred to as class_object objects). In order to represent all of the classes in a class hierarchy with class_object objects, there would be one class_object object for every class in the class hierarchy. In other words, if a class hierarchy has 60 classes, then there would be 60 class_object objects to describe the 60 classes.

Since class_object class 261 is itself a subclass of schema_object class 260, class_object class 261 inherits the attributes of schema_object class 260. Since schema_object class 260 is one of the "three superclasses", this includes a policy_bundle attribute.

Note that like any object, a particular class_object object may have, but is not required to have, a value for its policy_bundle attribute.

Whereas generally, the policy_bundle attribute of an object defines the implementations, if any, of the policy-driven methods of that object, for a class_object object, the policy_bundle attribute defines the policy-driven method implementations not of that class_object itself, but of the instances of the class described by that class_object.

Thus, in invoking on an object a method whose implementation is determined by the policy framework, the policy_bundle of that object itself is examined in the first phase of the policy mechanism. If that object's policy_bundle does not specify the implementation of the requested method, then the policy_bundle of the class_object describing that object's class is examined in the second phase of the policy mechanism. If, in turn, that class_object's policy bundle does not specify the implementation of the requested method, the class_object describing the object's superclass is next examined. This continues up to the object's "line of inheritance" until a policy_bundle specifying the method's implementation is found.

One technique for facilitating the search of an object's "line of inheritance" is to associate a unique class_ID with each of the class_object objects. Thus, the class_ID may be used not only for determining what object to construct when retrieving data from a database and for determining what tables and rows in the table to update when storing data from an object to a database but also for searching the "line of inheritance" to find a class_object object that has a policy for the requested method.

An example of searching of an object's "line of inheritance" can be demonstrated using a technical proposal object. Searching this technical proposal object's "line of inheritance" involves checking the class_object objects, which describe each of the classes in the technical object's "line of inheritance".

Given that there is this technical proposal object, which is an instance of technical proposal class 223, an example of a search order of the technical object's "line of inheritance" for a class_object object would be the following: (1) class_object object for technical proposal class 223; (2) class_object object for proposal class 221; (3) class_object object for document class 220; (4) class_object object for public_object class 210; and (5) class_object object for library_object class 200. The first class_object object encountered that specifies an implementation for the requested method type is used.

Figure 10C:
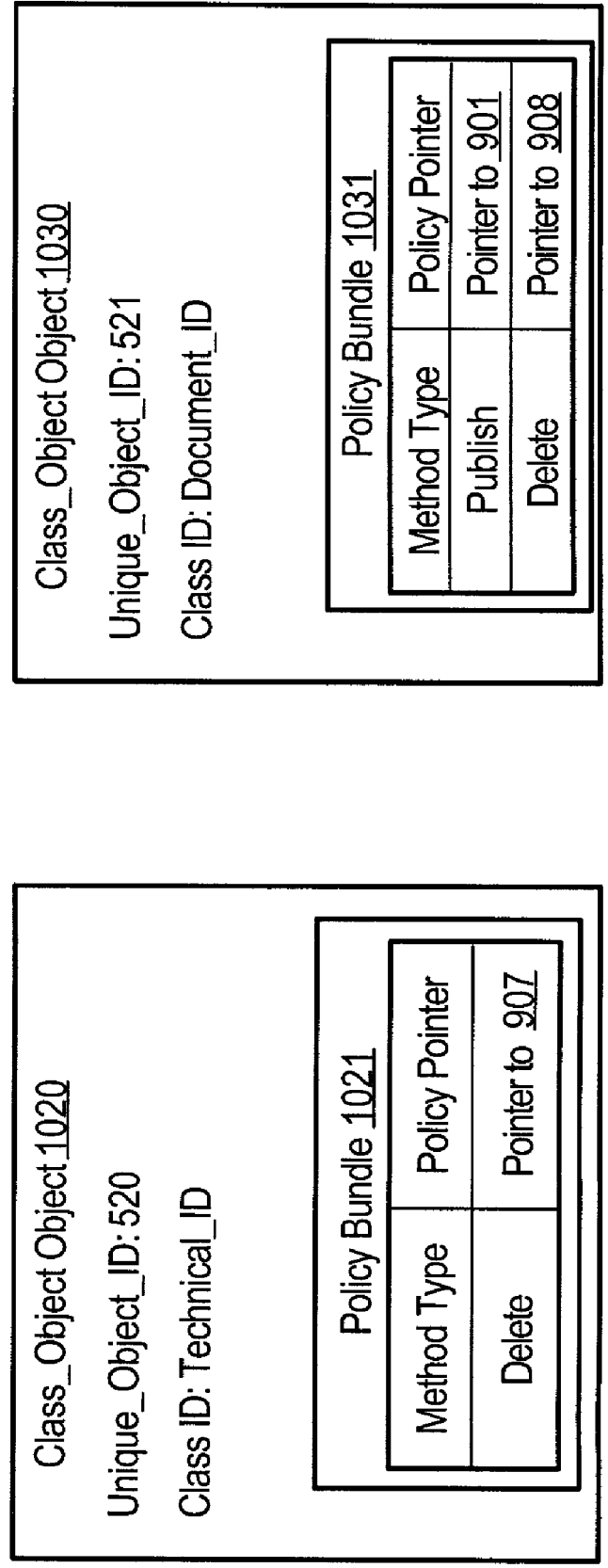
FIG. 10c is a block diagram illustrating class object objects.

FIG. 10c is a block diagram depicting two class_object objects. Object 1020 is a class_object object describing the technical proposal class 223. Object 1030 is a class_object object describing the document class 220, where document class 220 is the superclass of technical proposal class 223.

Both objects 1020 and 1030 have policy bundles (1021 and 1031) since both objects 1020 and 1030 are instances of one of the "three superclasses".

If the "publish" method is requested from a particular technical proposal object and a "publish" policy was not associated directly with that particular technical proposal object but class_object objects 1020 and 1030 were associated with the particular technical object (via the technical proposal object's line of inheritance), then the class_object object 1020 would be inspected first via policy bundle object 1021 to determine if a "publish" policy existed. Then the class_object object 1030 is inspected via policy bundle 1031 to determine if a "publish" policy exists. Since a "publish" policy object 901 exists in class_object object 1030, this "publish" policy object 901 is used to satisfy the request for "publish".

Hardware Overview

Figure 11:
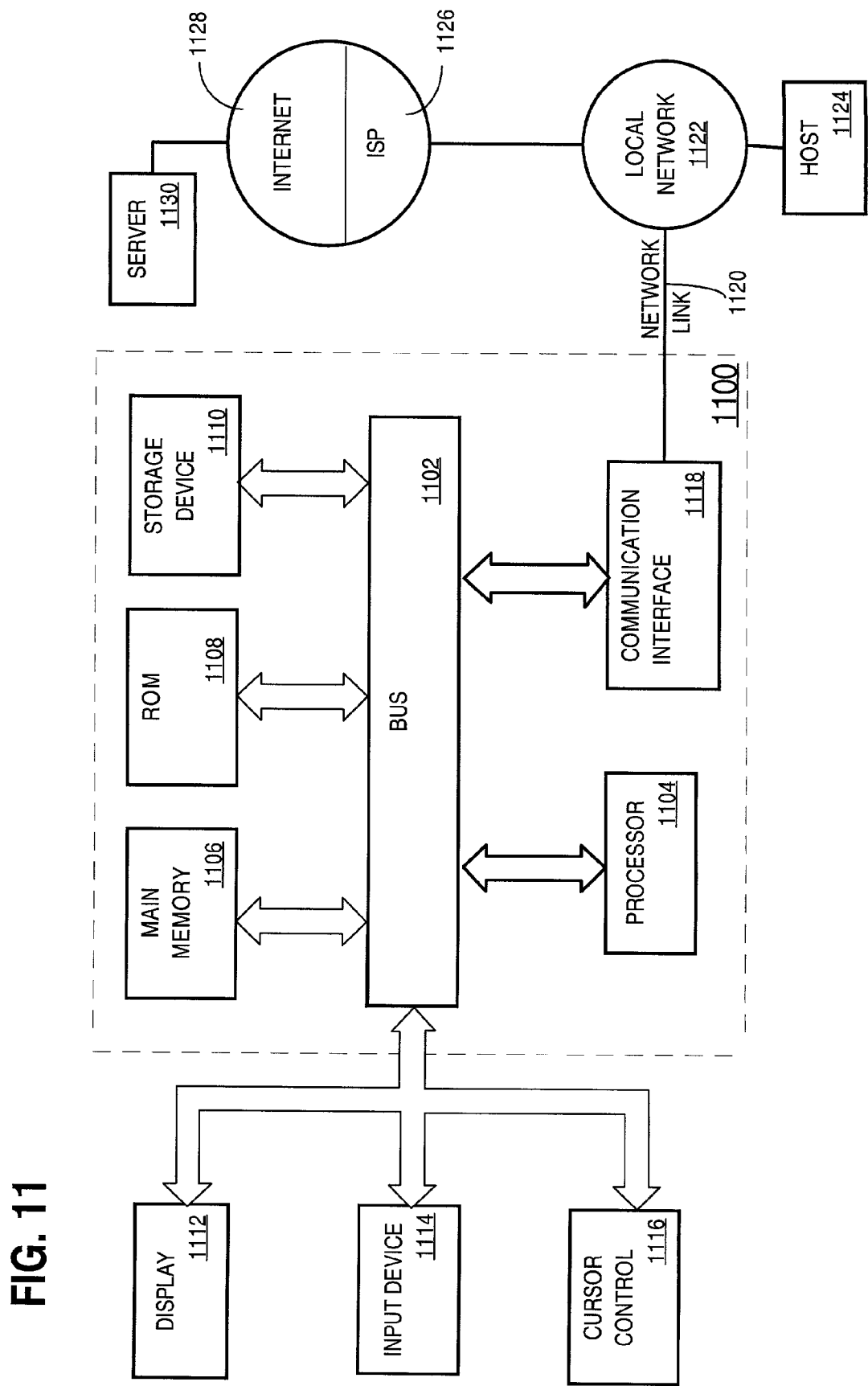
FIG. 11 is a computer system on which an embodiment of the invention may be implemented.

FIG. 11 is a block diagram that illustrates a computer system 1100 upon which an embodiment of the invention may be implemented. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are performed by computer system 1100 in response to processor 1104 executing one or more sequences of one or more instructions contained in main memory 1106. Such instructions may be read into main memory 1106 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution. In this manner, computer system 1100 may obtain application code in the form of a carrier wave.

What is claimed is:

1. A method comprising performing a machine-executed operation involving instructions, wherein the machine-executed operation is at least one of:
   A) sending the instructions over transmission media;
   B) receiving the instructions over transmission media;
   C) storing the instructions onto a machine-readable storage medium; and
   D) executing the instructions;
   wherein the instructions are instructions which, when executed by one or more processors, cause the one or more processors to perform the steps of:
   storing within a database and in association with a file system, a first object that defines a first method and an implementation of said first method, wherein said first object is an instance of a first object class; and
   associating said first method with a first instance of a second object class that defines the properties of a file type associated with said file system such that said first method belongs to said first instance of said second object class and is capable of performing operations on data stored in said first instance of said second class, wherein the first method is not a method in said second object class.

2. The method of claim 1, wherein said first method is not associated with a second instance of said second object class.

3. The method of claim 1, wherein said second object class defines properties of folders in a file system.

4. The method of claim 1, wherein said second object class defines properties of documents in a file system.

5. The method of claim 4, wherein said second object class is sub-classed with a sub-class that defines properties of a text type of document in a file system.

6. The method of claim 4, wherein said second object class is sub-classed with a sub-class that defines properties of a spreadsheet type of document in a file system.

7. The method of claim 4, wherein said second object class is sub-classed with a sub-class that defines properties of a presentation type of document in a file system.

8. The method of claim 1, wherein the instructions are instructions which, when executed by one or more processors, cause the one or more processors to perform the steps of:
   in response to receiving a request for a file system operation involving said first instance, instantiating a transaction object that defines one or more methods from a group of database operations consisting of an insert operation, a save operation, an update operation, a delete operation, a commit operation, and a rollback operation; and
   invoking at least one of said one or more methods for operation on said first instance of said second object class.

9. The method of claim 8, wherein invoking at least one of said one or more methods comprises invoking, in association with a single database transaction, more than one of said one or more methods.

10. The method of claim 1, wherein the instructions are instructions which, when executed by one or more processors, cause the one or more processors to perform the step of:
    maintaining a cache of file system metadata for one or more instances of said second object class.

11. The method of claim 10, wherein maintaining a cache of file system metadata comprises maintaining a cache of access permissions associated with instances of said second object class.

12. The method of claim 10, wherein maintaining a cache of file system metadata comprises
    maintaining a cache of a first access permission associated with said first instance of said second object class, wherein said first access permission is associated with said first instance based on said first method; and
    maintaining a cache of a second access permission associated with a second instance of said second object class, wherein said second access permission is associated with said second instance based on a second method defined in a third object that defines said second method and an implementation of said second method, wherein said third object is an instance of a third object class.

13. The method of claim 10, wherein maintaining a cache of file system metadata comprises maintaining a cache of pathnames to files that are instances of said second object class.

14. The method of claim 10, wherein maintaining a cache of file system metadata comprises
    maintaining a cache of a first pathname to said first instance of said second object class, wherein said first pathname is associated with said first instance based on said first method; and
    maintaining a cache of a second pathname to a second instance of said second object class, wherein said second pathname is associated with said second instance based on a second method defined in a third object that defines said second method and an implementation of said second method, wherein said third object is an instance of a third object class.

15. The method of claim 1, wherein associating said first method with a first instance of a class comprises:
    creating a first bundle object that is an instance of a first bundle class and that references one or more objects that define respective per-instance methods and corresponding implementations of said per-instance methods, wherein said first bundle class references said first object; and
    associating said first instance of said second object class with said first bundle object.

16. The method of claim 15, wherein associating said first instance of said second object class with said first bundle object comprises creating a pointer that belongs to said first instance to point to said first bundle object.

17. The method of claim 15, wherein creating said first bundle object comprises creating a pointer that belongs to said first bundle object to point to said one or more objects.

18. The method of claim 15, wherein associating said first instance of said second object class with said first bundle object comprises creating a reference that belongs to said first instance to reference said first bundle object.

19. The method of claim 18, wherein associating said first bundle object comprises creating a pointer that belongs to said first bundle object to point to said one or more objects.

20. The method of claim 15, wherein associating said first bundle object comprises creating a reference that belongs to said first bundle object to reference said one or more objects.

21. The method of claim 15, wherein creating said first bundle object comprises creating a hash table for indexing said first bundle object.

22. The method of claim 21, wherein creating said first bundle object comprises placing an entry in said hash table, the method further comprising the computer-implemented steps of:
 associating a key and a value with said entry;
 using a method name as said key; and
 using an association between said first bundle object and said first object as said value.

23. The method of claim 22, wherein said value is a pointer to said first object.

24. The method of claim 22, wherein said value is a reference to said first object.

\* \* \* \* \*